United States Patent
Wagner

(10) Patent No.: US 9,803,385 B2
(45) Date of Patent: Oct. 31, 2017

(54) FLOORING COMPONENT

(71) Applicant: Grigorij Wagner, Falkensee (DE)

(72) Inventor: Grigorij Wagner, Falkensee (DE)

(*) Notice: Subject to any disclaimer, the term of this patent is extended or adjusted under 35 U.S.C. 154(b) by 0 days.

(21) Appl. No.: 15/036,220

(22) PCT Filed: Sep. 23, 2014

(86) PCT No.: PCT/EP2014/070221
§ 371 (c)(1),
(2) Date: May 12, 2016

(87) PCT Pub. No.: WO2015/071019
PCT Pub. Date: May 21, 2015

(65) Prior Publication Data
US 2016/0289984 A1    Oct. 6, 2016

(30) Foreign Application Priority Data
Nov. 12, 2013  (WO) .................. PCT/EP2013/073566

(51) Int. Cl.
*E04F 15/02* (2006.01)
*E04G 23/02* (2006.01)
(Continued)

(52) U.S. Cl.
CPC ........ *E04G 23/0285* (2013.01); *B29C 47/003* (2013.01); *B29C 65/58* (2013.01);
(Continued)

(58) Field of Classification Search
CPC ........ E04F 15/02038; E04F 2201/0547; E04F 2201/0138; E04F 2201/044; E04F 2201/0523; E04F 2201/0115
See application file for complete search history.

(56) References Cited

U.S. PATENT DOCUMENTS 6,505,452 B1 * 1/2003 Hannig ..................... B27F 1/04
52/582.1
6,647,690 B1 * 11/2003 Martensson ............ E04F 15/02
52/489.1
(Continued)

FOREIGN PATENT DOCUMENTS

CN        1730861 A     2/2006
DE        20206751 U1   8/2002
(Continued)

OTHER PUBLICATIONS

Machine translation of CN1730861A.

*Primary Examiner* — Gisele Ford
(74) *Attorney, Agent, or Firm* — David P. Dickerson

(57) ABSTRACT

A flooring component (700) comprising a main body portion (717) defining a first major surface (701) and a second major surface (702), a first extending portion (720) that extends from the main body portion in a first direction, the first extending portion defining a third surface coplanar to at least a portion of the first major surface, and a second extending portion (730) that extends from the main body portion in a second direction opposite the first direction, the second extending portion defining a fourth surface coplanar to at least a portion of the second major surface, wherein at least 60% of the main body portion, the first extending portion and the second extending portion is of a first material, the first extending portion comprises a female structure (722) on a side of the first extending portion opposite the third surface, the second extending portion comprises a male structure (733) on a side of the second extending portion opposite the fourth surface, the flooring component comprises, in a region of at least one of the female structure and the male structure, a resilient portion of a second material more pliable than the first material, and the female structure
(Continued)

is of a shape that snappingly engages the male structure using a resilience of the resilient portion.

30 Claims, 14 Drawing Sheets

(51) Int. Cl.
*E04F 15/10* (2006.01)
*B29C 47/00* (2006.01)
*B29C 65/58* (2006.01)
*B29C 73/04* (2006.01)
*B29L 31/00* (2006.01)

(52) U.S. Cl.
CPC ........ *B29C 73/04* (2013.01); *E04F 15/02038* (2013.01); *E04F 15/02044* (2013.01); *E04F 15/10* (2013.01); *E04F 15/105* (2013.01); *B29L 2031/732* (2013.01); *E04F 2201/0161* (2013.01); *E04F 2201/03* (2013.01); *E04F 2201/0505* (2013.01); *E04F 2201/0523* (2013.01)

(56) References Cited

U.S. PATENT DOCUMENTS

| 8,745,952 | B2* | 6/2014 | Perra | E04F 15/02 52/530 |
|---|---|---|---|---|
| 2007/0130872 | A1* | 6/2007 | Goodwin | E04F 15/02 52/592.1 |
| 2007/0193178 | A1* | 8/2007 | Groeke | E04F 15/02 52/578 |
| 2007/0267250 | A1 | 11/2007 | Wolff | |
| 2008/0104921 | A1* | 5/2008 | Pervan | E04F 15/02 52/588.1 |
| 2008/0134607 | A1* | 6/2008 | Pervan | E04F 15/02038 52/395 |
| 2009/0064624 | A1* | 3/2009 | Sokol | E04F 15/02 52/589.1 |
| 2009/0100782 | A1* | 4/2009 | Groeke | E04F 15/02 52/589.1 |
| 2009/0133353 | A1* | 5/2009 | Pervan | E04F 15/02 52/588.1 |
| 2009/0249733 | A1* | 10/2009 | Moebus | E04F 15/04 52/588.1 |
| 2010/0031594 | A1* | 2/2010 | Liu | E04F 15/02 52/403.1 |
| 2010/0281803 | A1* | 11/2010 | Cappelle | E04F 15/02 52/309.1 |
| 2011/0030303 | A1* | 2/2011 | Pervan | B27F 1/08 52/582.1 |
| 2011/0167750 | A1* | 7/2011 | Pervan | E04F 15/04 52/588.1 |
| 2011/0258959 | A1* | 10/2011 | Braun | E04F 15/02 52/588.1 |
| 2013/0014463 | A1* | 1/2013 | Pervan | E04F 15/02038 52/588.1 |
| 2013/0104478 | A1* | 5/2013 | Meersseman | E04F 13/0894 52/309.1 |
| 2013/0152500 | A1* | 6/2013 | Engstrom | E04F 15/02038 52/588.1 |
| 2013/0305650 | A1* | 11/2013 | Liu | E04F 15/02038 52/592.1 |
| 2014/0290173 | A1* | 10/2014 | Hamberger | E04F 13/0894 52/582.2 |

FOREIGN PATENT DOCUMENTS

| DE | 102010012572 B3 | 7/2011 |
|---|---|---|
| WO | 2010072357 A2 | 7/2010 |
| WO | 2012126046 A1 | 9/2012 |
| WO | 2013044377 A1 | 4/2013 |

* cited by examiner

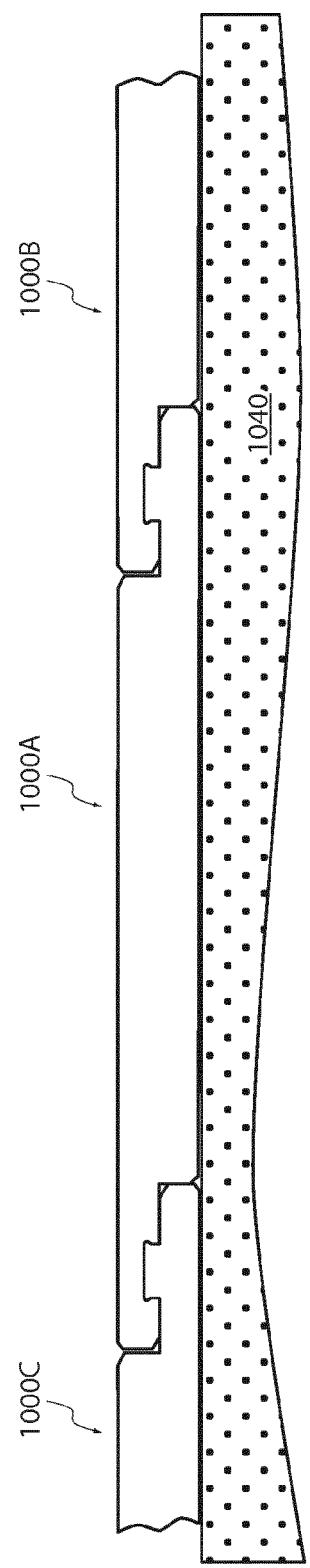
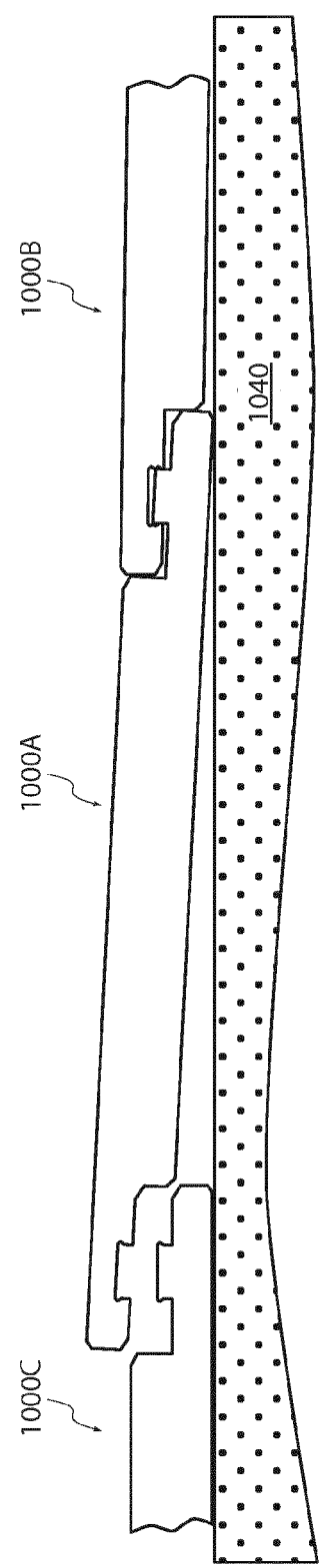
Fig. 10A
Fig. 10B

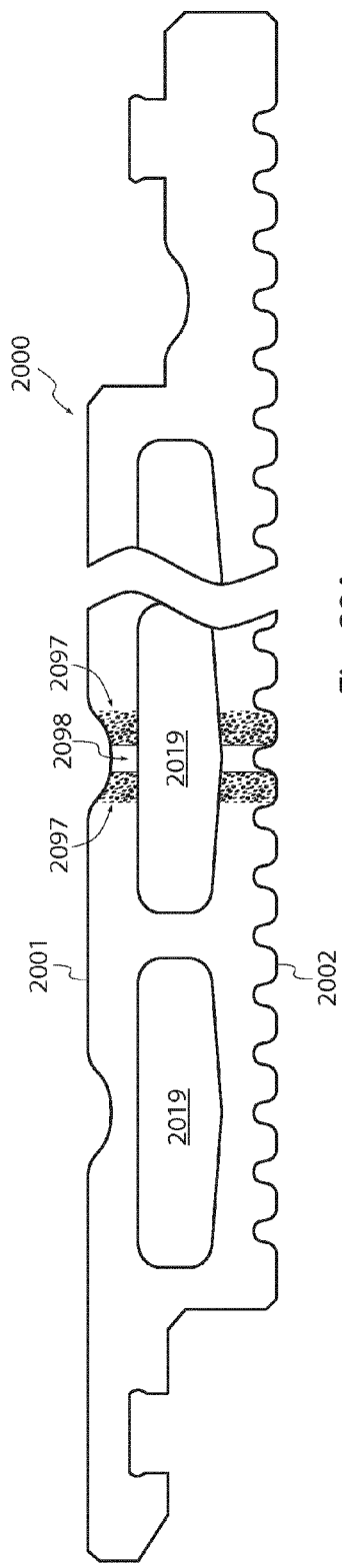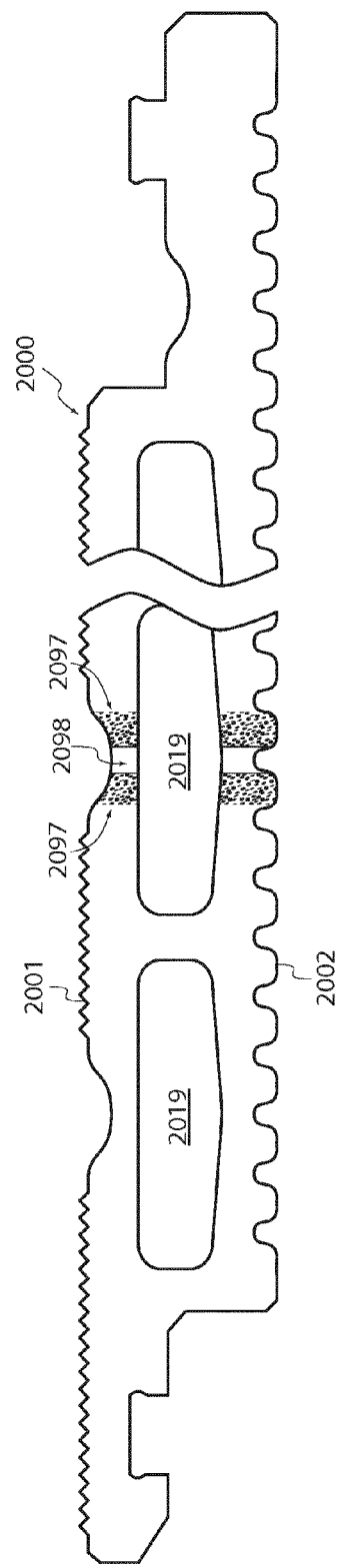

FLOORING COMPONENT

BACKGROUND OF THE DISCLOSURE

Field of the Disclosure

The present invention relates to a flooring component, to apparatuses and methods for manufacturing a flooring component, to methods of installing flooring and to methods of repairing flooring.

Description of the Related Art

Various flooring components are known to the prior art. These include ceramic tiles, wooden and laminate parquet, tatami mats as well as sheets of cork or linoleum.

The various flooring components known to the prior art offer a wide range of characteristics in terms of durability, aesthetic appearance, ease of manufacture, material cost, etc. There nonetheless remains room for improvement.

The present disclosure expounds upon this background.

SUMMARY OF THE PRESENT DISCLOSURE

The aim of the present summary is to facilitate understanding of the present disclosure. The summary thus presents concepts and features of the present disclosure in a more simplified form and in looser terms than the detailed description below and should not be taken as limiting other portions of the present disclosure.

Loosely speaking, the present disclosure teaches a flooring component that can be removed from/inserted into flooring assembled from a plurality of such flooring components without significantly disrupting placement of adjacent flooring components, thus allowing a worn-out flooring component to be replaced individually. In this respect, the present disclosure teaches a flooring component that can be engaged/disengaged from adjacent flooring components by a pivotal motion of the flooring component relative to a floor on which the adjacent flooring components lie. The present disclosure moreover teaches a flooring component having an engagement mechanism formed on an upward/downward facing surface at a respective edge of the flooring component, counterparts of the engagement mechanisms of adjacent flooring components being engageable/disengageable by relative motion in a vertical direction.

By allowing for embodiments in which the engagement mechanism divides a thickness of the flooring component into just two parts, the load strength of the flooring component can be improved over flooring components having engagement mechanisms that divide the thickness of the flooring component into more than two parts such as laterally engaging tongue and groove fittings.

The flooring component may be manufactured of an inexpensive material, e.g. recycled plastic or a wood plastic composite. By allowing for embodiments having a constant cross-section, the flooring component may be manufactured in a cost effective manner, e.g. by extrusion.

Due to its aforementioned characteristics, the flooring component of the present disclosure may be used in applications where easy replacement, high load strength and low cost are required, for example as flooring for a cargo container.

The flooring component loosely described above can be embodied in the form of a flooring component comprising: a main body portion defining a first major surface and a second major surface; a first extending portion that extends from the main body portion in a first direction, the first extending portion defining a third surface coplanar to at least a portion of the first major surface; and a second extending portion that extends from the main body portion in a second direction opposite the first direction, the second extending portion defining a fourth surface coplanar to at least a portion of the second major surface, wherein at least 60% of the main body portion, the first extending portion and the second extending portion is of a first material, the first extending portion comprises a female structure on a side of the first extending portion opposite the third surface, the second extending portion comprises a male structure on a side of the second extending portion opposite the fourth surface, the flooring component comprises, in a region of at least one of the female structure and the male structure, a resilient portion of a second material more pliable than the first material, and the female structure is of a shape that snappingly engages the male structure using a resilience of the resilient portion.

Other objects, advantages and embodiments of the present disclosure will become apparent from the detailed description below, especially when considered in conjunction with the accompanying drawings.

BRIEF DESCRIPTION OF THE DRAWINGS

The Figures show:

FIG. 10A a schematic (widthwise) cross-section through a plurality of flooring components arranged on a surface to form flooring in accordance with the present disclosure;

FIG. 10B a schematic (widthwise) cross-section through a plurality of flooring components during a process of installing/repairing flooring in accordance with the present disclosure;

FIGS. 20A and 20B a schematic (widthwise) cross-section through an embodiment of a flooring component in accordance with the present disclosure.

DETAILED DESCRIPTION

Figure 1:
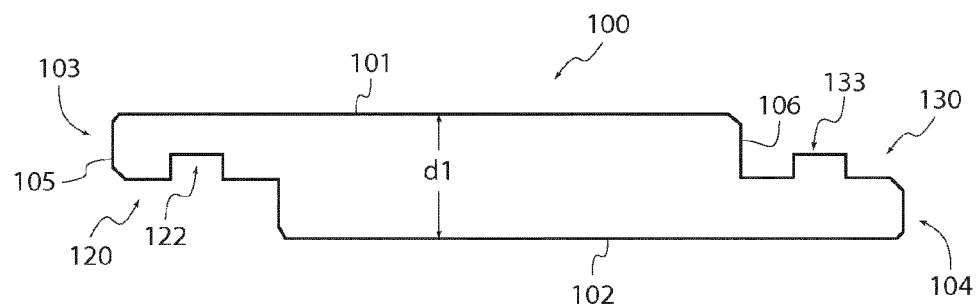
FIG. 1 a (widthwise) cross-section through an embodiment of a flooring component in accordance with the present disclosure.

The various embodiments of the present disclosure and of the claimed invention, in terms of both structure and operation, will be best understood from the following detailed description, especially when considered in conjunction with the accompanying drawings.

Before elucidating the embodiments shown in the Figures, various embodiments of the present disclosure will first be described in general terms.

First General Description

The flooring component may have the form of a tile or pallet having a first engagement structure at a first edge of the flooring component and a second engagement structure at a second, (diagonally) opposite edge of the flooring component. The first engagement structure and the second engagement structure may be provided at diagonally opposite portions of the flooring component.

The first and second engagement structures may be structured and arranged such that engagement/disengagement of the first engagement structure and the second engagement structure of another such flooring component is effectible (only) in a direction in a range of ±10°, ±30° or ±45° of perpendicular to a major face of the flooring component. For example, one of the first and second engagement structures may comprise a male structure, e.g. having a shape of a ridge or knob, and the other of the first and second engagement structures may comprise a female structure, e.g. having a counterpart shape of a groove or hole. As such, the male structure may be termed a "protruding structure" and the female structure may be termed a "hollow structure." Any of the male/female structures may protrude/form a recess in a direction (substantially) perpendicular to the major face of the flooring component. (An elucidation of the term "any" is given in the closing paragraphs of this specification.) Any of the male/female structures may be provided on/in a (downward/upward facing) surface constituting a portion of a major face of the flooring component. Any of the male/female structures may be spaced from the first/second edge of the flooring component, e.g. spaced inwardly from the first/second edge in a direction of the other of the first/second edge.

As used in this specification, the term "face" may be understood in the sense of a "side," i.e. in the sense of one or more surfaces that form a "side" of an object, e.g. of the flooring component. For example, in the case of an ivory die with black eyes, the die could be deemed as having six sides or "faces," each face having a planar ivory surface and between one and six curved black surfaces forming the respective eyes.

The first and second engagement structures may be structured and arranged such that the first engagement structure engages the second engagement structure of the other flooring component when the flooring component and the other flooring component are arranged such that a minor face at/proximate to the first edge of the flooring component is adjacent to/abuts a minor face at/proximate to the second edge of the other flooring component and (a major surface of) a major face of the flooring component and (a major surface of) a major face of the other flooring component are coplanar.

The first engagement structure may be a counterpart of the second engagement structure, e.g. in the sense that the first engagement structure has a structure that is an equal opposite of the second engagement structure. Similarly, the first engagement structure may be a counterpart of the second engagement structure in the sense that a male structure of either of the first and second engagement structures has a structure that, e.g. in maximal engagement with the other of the first and second engagement structures, would occupy at least 60%, at least 70%, at least 80% or at least 90% of a female structure of the other of the first and second engagement structures.

Further details of the flooring component may be taken from the following descriptions that, as will be readily apparent and distinguishable to the skilled reader, rely on alternative nomenclature to describe some aspects of the flooring component.

Second General Description

The flooring component of the present disclosure, e.g. as described in the first general description supra, may likewise be described in terms of a flooring component body comprising a first overlap portion and a second overlap portion.

The flooring component may comprise/consist of a flooring component body having a first major face and a second major face opposite the first major face. The flooring component body may be a six-faced body comprising the first major face, the second major face and four minor faces. The first major face may comprise or define a first major surface, and the second major face may comprise or define a second major surface. One or each of the first and second major surfaces may be a (substantially) planar surface, e.g. a surface that fits entirely between two parallel planes separated by no more than 5 mm, 10 mm or 20 mm, for example. The first and second major surfaces may be (substantially) parallel. The flooring component body may comprise one or more rounded or beveled corners.

The flooring component body may have the form of a tile or pallet and may have a first overlap portion at a first edge of the flooring component body and a second overlap portion at a second, (diagonally) opposite edge of the flooring component body. The first overlap portion and the second overlap portion may be provided at diagonally opposite portions of the flooring component body. The peripheral outline of the flooring component body may have substantially a shape of a rectangular cuboid excepting the first overlap portion and the second overlap portion.

The first overlap portion may be structured to overlap and engage the second overlap portion (of the flooring component body) of another such flooring component, e.g. when the flooring component and the other flooring component are arranged such that a minor face at/proximate to the first edge of the flooring component (body) is adjacent to/abuts a minor face at/proximate to the second edge (of the flooring component body) of the other flooring component and (a major surface of) a major face of the flooring component (body) and (a major surface of) a major face (of the flooring component body) of the other flooring component are coplanar. The first overlap portion may have a cross-section that is a counterpart of a cross-section of the second overlap portion, e.g. along a planar cross-section through the first and second overlap portions perpendicular to a major face of the flooring component (body) or to both a major and a minor face of the flooring component (body).

The first overlap portion and the second overlap portion may form counterparts of an engagement mechanism, e.g. of an engagement mechanism that inhibits lateral motion of the flooring component (body) away from (the flooring component body of) the other flooring component when the first overlap portion of the flooring component overlaps the second overlap portion of the other flooring component, for example as described above. The engagement mechanism may be a snap lock engagement mechanism and may inhibit vertical motion of the flooring component (body) away from (the flooring component body of) the other flooring component. In the present context, lateral motion may be understood as motion in a direction substantially parallel to a major face of the flooring component (body) and vertical motion may be understood as motion in a direction substantially perpendicular to a major face of the flooring component (body). The present disclosure also uses the term "engagement structure" to designate the respective structures constituting the counterparts of the engagement mechanism.

One of the first and second overlap portions may comprise a male structure, e.g. having a shape of a ridge or knob, and the other of the first and second overlap portions may comprise a female structure, e.g. having a counterpart shape of a groove or hole. As such, the male structure may be termed a "protruding structure" and the female structure may be termed a "hollow structure." The male structure may have a shape that matingly engages the female structure. Similarly, the male structure may have a shape that snappingly engages the female structure. The male structure and the female structure may form the engagement mechanism counterparts, i.e. an engagement mechanism counterpart pair. The first overlap portion and the second overlap portion may comprise a plurality of such engagement mechanism counterpart pairs. The plurality of engagement mechanism counterpart pairs may comprise engagement mechanism counterparts implementing differing engagement mechanisms. Each of the male/female structures may have a minimum dimension in a widthwise and/or lengthwise direction of the flooring component, e.g. as defined below, of at least one sixth or at least one fourth of a dimension of the respective first/second overlap portion in the widthwise direction of the flooring component. Each of the male/female structures may have a maximum dimension in a widthwise and/or lengthwise direction of the flooring component, e.g. as defined below, of no more than one third or no more than one half of a dimension of the respective first/second overlap portion in the widthwise direction of the flooring component.

The first overlap portion may comprise a first face. The first face may be on a side of the first overlap portion opposite a side of first overlap portion that defines a portion of a major face of the flooring component (body). The first face may face in a direction perpendicular to a major face of the flooring component (body). For example, the first face may be an upward-facing face (that faces in an upward direction) or a downward-facing face (that faces in a downward direction). The engagement mechanism counterpart formed by the first overlap portion may be formed on the first face.

Similarly, the second overlap portion may comprise a second face. The second face may be on a side of the second overlap portion opposite a side of the second overlap portion that defines a portion of a(nother) major face of the flooring component (body). The first and second faces may face in opposite directions. As such, the second face may face in a direction perpendicular to a(nother) major face of the flooring component (body) and may be an upward-facing face (that faces in an upward direction) or a downward-facing face (that faces in a downward direction). For example, the second face may be an upward-facing face if the first face is a downward-facing face or a downward-facing face if the first face is an upward-facing face. The engagement mechanism counterpart formed by the second overlap portion may be formed on the second face.

The first overlap portion and the second overlap portion may be formed such that engagement/disengagement of the engagement mechanism counterparts is effectible (only) in a direction in a range of ±10°, ±30° or ±45° of perpendicular to a major face of the flooring component (body). For example, the male/female structure may protrude/form a recess in a direction (substantially) perpendicular to a major face of the flooring component (body).

The first overlap portion and the second overlap portion may be formed such that the first overlap portion of one flooring component is engageable/disengageable from the second overlap portion of another flooring component by a single pivotal motion of the one flooring component (body) around an axis proximate to the second overlap portion of the one flooring component.

The male structure may be offset from an edge/side of the respective first/second overlap portion comprising the male structure distal from the other of the first/second overlap portions. For example, the male structure may be distanced from an (outermost) edge/side of the flooring component (body) in a generally inward direction along a width of the flooring component (body), e.g. as defined below. The male structure may be offset/distanced from the aforementioned edge/side by at least 10% or at least 20% of a width of a first/second face, as described above, on which the male structure is formed. The male structure may be offset/distanced from the aforementioned edge/side by not more than 40%, not more than 50% or not more than 60% of a width of a first/second face, as described above, onto which the male structure is formed. The width of the first/second face may be measured in a direction of a width of the flooring component (body), e.g. as defined below. The remarks of this paragraph apply, mutatis mutandis, to the female structure.

As discussed in further detail infra, the flooring component may be shaped such that, when an engagement structure of the flooring component is engaged with a (counterpart) engagement structure of another (such) flooring component, a gap is provided between a major surface of the flooring component and a (substantially) coplanar major surface of the other flooring component. For example, the engagement structure (e.g. a male/female structure) may be offset/distanced from an inner-lying minor lateral surface of the flooring component by at least 8 mm, at least 10 mm, at least 15 mm or at least 20 mm more than a counterpart engagement structure (e.g. a counterpart female/male structure) is offset/distanced from an opposite, outer-lying minor lateral surface of the flooring component. The inner-lying minor lateral surface may be a surface intermediate/interconnecting a major surface of the flooring component and the first face of the first overlap portion, and the outer-lying minor lateral surface may be a surface intermediate/interconnecting said major surface and the second face of the second overlap portion.

The first overlap portion may extend along at least 50%, at least 80% or an entirety of the first edge. Similarly, the second overlap portion may extend along at least 50%, at least 80% or an entirety of the second edge.

The flooring component (body) may have a thickness in the range of 8 mm to 100 mm, e.g. in the range of 25 to 50 mm. The thickness may be measured from a first major face of the flooring component (body) to a second major face of the flooring component (body), e.g. in a region of maximum distance/thickness from the first major face to the second major face in a direction perpendicular to the first major face. Similarly, the thickness may be measured from a major side of a rectangular cuboid bounding box enclosing the flooring component (body) to an opposite major side of the bounding box in a direction perpendicular to the major sides.

The flooring component (body) may have a length in the range of 15 cm to 300 cm, e.g. for domestic use. Similarly, the flooring component (body) may have a length in the range of 2 m to 30 m, e.g. for industrial use. The length may be measured in a direction perpendicular to the thickness. For example, the length may be measured from a (distal) surface of a minor face of the flooring component (body) that extends across the flooring component body from the first overlap portion to the second overlap portion to a (distal) surface of an opposite minor face of the flooring component (body) that likewise extends across the flooring component body from the first overlap portion to the second overlap portion. Similarly, the length may be measured from a first minor side of a rectangular cuboid bounding box enclosing the flooring component (body) to a second, opposite minor side of the bounding box in a direction perpendicular to the first/second minor side, where each of the first and second minor sides is a side adjacent to the flooring component body from the first overlap portion to the second overlap portion.

The flooring component (body) may have a width, e.g. as measured in a direction perpendicular to both the thickness and the length, in the range of 15 cm to 300 cm. For example, the width may be measured from a surface of a minor face of the flooring component (body) distal from the first overlap portion to a surface of an opposite minor face of the flooring component (body) distal from the second overlap portion or from a first minor side of a rectangular cuboid bounding box enclosing the flooring component (body) to a second, opposite minor side of the bounding box in a direction perpendicular to the first/second minor sides, where the first minor side is a side adjacent solely to the first overlap portion and the second minor side is a side adjacent solely to the second overlap portion.

One or both of the first overlap portion and the second overlap portion may have a maximal thickness of less than 80% of a thickness of the flooring component (body) and may have a minimal thickness of at least 20% of a thickness of the flooring component (body), e.g. as defined supra. Similarly, one or both of the first overlap portion and the second overlap portion may have a maximal thickness of less than 70% of a thickness of the flooring component (body) and may have a minimal thickness of at least 30% of a thickness of the flooring component (body). Similarly, one or both of the first overlap portion and the second overlap portion may have a maximal thickness of less than 60% of a thickness of the flooring component (body) and may have a minimal thickness of at least 40% of a thickness of the flooring component (body). The maximal/minimal thickness of the first/second overlap portion may be measured in direction parallel to a thickness (direction) of the flooring component (body), e.g. as defined supra, and may be measured at a location of the male/female structure.

The first overlap portion and the second overlap portion may be formed such that at least 50%, at least 80% or at least 90% of the first face of the first overlap portion of the flooring component (body) abuts the second face of the second overlap portion (of the flooring component body) of the other flooring component when the first overlap portion of the flooring component (body) overlaps the second overlap portion (of the flooring component body) of the other flooring component, for example as described above. The first and/or second overlap portion may be formed such that at least 50%, at least 60% or at least 75% of an area of the first/second face is located in a central third or in a central fifth (of a thickness) of the flooring component (body), e.g. as defined supra.

The first/second overlap portion may have a width in a widthwise direction of the flooring component that differs from the width of the other of the first/second overlap portion in a widthwise direction of the flooring component, e.g. by an amount (substantially) equal to a dimension of the aforementioned gap (e.g. as measured in a widthwise direction of the flooring component). In other words, the respective widths of the first/second overlap portions may differ by at least 8 mm, at least 10 mm, at least 15 mm or at least 20 mm.

The first face may have a surface having a shape that is a counterpart of a shape of a surface of the second face. For example, an entire surface of the first face may have a shape that is a counterpart shape of an entire surface of the second face. A sum of a thickness of the first overlap portion and a (counterpart) thickness of the second overlap portion may (substantially) equal a thickness of the flooring component (body), e.g. when the first overlap portion of the flooring component (body) overlaps/engages the second overlap portion (of the flooring component body) of another flooring component, for example as described above. In the present context, a "thickness" and "counterpart thickness" pair may be understood as respective thicknesses measured through neighboring points on adjacent surfaces of the first/second overlap portions when the first overlap portion of the flooring component (body) overlaps/engages the second overlap portion (of the flooring component body) of another flooring component as described above. In the present context, "(substantially) equal" may be understood as being equal, as being equal to within 5% (of the larger value) or as being equal to within 10% (of the larger value). The above equation may hold for a plurality of measurement points on the first/second face, e.g. for at least 80%, at least 90% or an entirety of an area of the first/second face. The thickness of the first overlap portion may be a distance from a portion of the major face of the flooring component (body) defined by the first overlap portion to the first face. Similarly, the thickness of the first overlap portion may be a distance from a plane defined by the major face of the flooring component (body) to the first face. The thickness of the second overlap portion may be a distance from a portion of the major face of the flooring component (body) defined by the second overlap portion to the second face. Similarly, the thickness of the second overlap portion may be a distance from a plane defined by another major face of the flooring component (body) to the second face. The thickness of the first/second overlap portion may be measured in direction parallel to a thickness (direction) of the flooring component (body), e.g. as defined supra.

The first/second major surface may constitute a (lower) surface that abuts the floor when the flooring component is laid on a floor with other such flooring components to form flooring. Similarly, the other of the first/second major surface may constitute a(n upper) flooring surface when the flooring component is laid on the floor with other such flooring components to form flooring.

One or each of the first and second major surfaces may be a contiguous surface. One or each of the first and second major surfaces may be a surface that constitutes an entirety of the respective first/second major face of the flooring component (body).

Similarly, one or each of the first and second major surfaces may be a disjointed surface, i.e. be defined by a plurality of disjointed surfaces. For example, the flooring component (body) may comprise a plurality of grooves (in the first/second major face) that disjoin neighboring regions of the first/second major surface. The grooves may be formed and arranged to channel dirt and/or liquids away from the first/second major surface. Similarly, the flooring component (body) may comprise two or more layers of generally tubular structures arranged in parallel, the generally tubular structures of each layer being arranged (substantially) parallel to the generally tubular structures of adjacent layers. In other words, the flooring component (body) may have a (pallet-like) structure akin to so-called "waffle fries." Such structures weigh significantly less and require significantly less structural material than a solid structure defining a similarly sized flooring component (body), while also allowing dirt and liquids to be transported away from the first/second major surface.

One or each of the first and second major surfaces may extend (in a first direction) an entire distance from a first side of the flooring component (body) to a second side of the flooring component (body) opposite the first side of the flooring component (body). Similarly, one or each of the first and second major surfaces may extend (in a second direction perpendicular to the first direction) an entire distance from a third side of the flooring component (body) to a fourth side of the flooring component (body) opposite the third side of the flooring component (body).

Design of the flooring component (body) as described above enables the first overlap portion of one flooring component to be engageable/disengageable from the second overlap portion of another flooring component by a single pivotal motion (of the flooring component body) of the one flooring component around an axis proximate to the second overlap portion of the one flooring component, e.g. an axis intersecting/collinear with a (corner) edge of the flooring component (body) (most) distal/diagonally opposite from first overlap portion. Similarly, design of the flooring component (body) as described above enables the second overlap portion of one flooring component to be engageable/disengageable from the first overlap portion of another flooring component by a single pivotal motion (of the flooring component body) of the one flooring component around an axis proximate to the first overlap portion of the one flooring component, e.g. an axis intersecting/collinear with a (corner) edge of the flooring component (body) (most) distal/diagonally opposite from second overlap portion. The axis may extend in a lengthwise direction of the flooring component, e.g. in a direction perpendicular, in a range of ±10° of perpendicular or in a range of ±20° of perpendicular to a minor lateral side of a bounding box enclosing the flooring component. The engagement/disengagement may comprise engagement/disengagement of male/female structures of the first/second overlap portions and/or engagement/disengagement of counterparts of an engagement mechanism defined by the first/second overlap portions.

Third General Description

The flooring component of the present disclosure, e.g. as described in the first or second general description supra, may likewise be described in terms of a flooring component body comprising a first recessed portion and a second recessed portion.

The flooring component may comprise a flooring component body having a first major face and a second major face opposite the first major face. The flooring component body may be a six-faced body comprising the first major face, the second major face and four minor faces. The first major face may comprise or define a first major surface, and the second major face may comprise or define a second major surface. One or each of the first and second major surfaces may be a (substantially) planar surface, e.g. a surface that fits entirely between two parallel planes separated by no more than 5 mm, 10 mm or 20 mm, for example. The first and second major surfaces may be (substantially) parallel. The flooring component body may comprise one or more rounded or beveled corners.

A peripheral outline of the flooring component body may have substantially a shape of a rectangular cuboid excepting a first recessed portion along a first edge of the first major surface and a second recessed portion along a second edge of the second major surface diagonally opposite the first edge. In other words, the flooring component body may comprise first/second recessed portions at diagonally opposite edges/corners of the flooring component body. The first and second recessed portions may constitute/define/shape a hollowed-out volume, e.g. a recess, cutout, slit, groove, hole, channel, etc., at the respective edge of the respective major surface of the flooring component body. The boundary surface defining the interface of the first/second recessed portions and the flooring component body may have a complex shape, e.g. for defining counterparts of an engagement mechanism as discussed infra. The boundary surface may be complex in the sense that it comprises (a plurality of) both concave and convex portions. Notwithstanding the first and second recessed portions, the flooring component body may have the form of a tile, slab or pallet.

The first/second major surface may constitute a (lower) surface that abuts the floor when the flooring component body is laid on a floor with other such flooring component bodies to form flooring. Similarly, the other of the first/second major surface may constitute a(n upper) flooring surface when the flooring component body is laid on the floor with other such flooring component bodies to form flooring.

One or each of the first and second major surfaces may be a contiguous surface. One or each of the first and second major surfaces may be a surface that constitutes an entirety of the respective first/second major face of the flooring component body outside of the first and second recessed portions.

Similarly, one or each of the first and second major surfaces may be a disjointed surface, i.e. be defined by a plurality of disjointed surfaces. For example, the flooring component body may comprise a plurality of grooves (in the first/second major face) that disjoin neighboring regions of the first/second major surface. The grooves may be formed and arranged to channel dirt and/or liquids away from the first/second major surface. Similarly, the flooring component body may comprise two or more layers of generally tubular structures arranged in parallel, the generally tubular structures of each layer being arranged (substantially) parallel to the generally tubular structures of adjacent layers. In other words, the flooring component body may have a structure akin to so-called "waffle fries." Such structures weigh significantly less and require significantly less structural material than a solid structure defining a similarly sized flooring component body, while also allowing dirt and liquids to be transported away from the first/second major surface.

One or each of the first and second major surfaces may extend (in a first direction) an entire distance from a first side of the flooring component body to a second side of the flooring component body opposite the first side of the flooring component body. Similarly, one or each of the first and second major surfaces may extend (in a second direction perpendicular to the first direction) an entire distance from a third side of the flooring component body to a fourth side of the flooring component body opposite the third side of the flooring component body.

The first recessed portion and the second recessed portion may be structured such that a portion of the flooring component body shaped by the first recessed portion overlaps and engages a portion of another such flooring component body shaped by the second recessed portion of the other flooring component, e.g. when the flooring component and the other flooring component are arranged such that a minor face at/proximate to the first edge of the flooring component body is adjacent to/abuts a minor face at/proximate to the second edge of the other flooring component body and the first major face of the flooring component body and the second major face of the other flooring component are coplanar.

The first recessed portion may have a cross-section that is a counterpart of a cross-section of the second recessed portion, e.g. along a planar cross-section through the first and second recessed portions perpendicular to a major face or to both a major and a minor face of the flooring component. One or both of the first and second recessed portions may have substantially a shape of a rectangular cuboid excepting portions/structures that define counterparts of an engagement mechanism, e.g. as discussed infra.

The first recessed portion and the second recessed portion may define counterparts of an engagement mechanism, e.g. of an engagement mechanism that inhibits lateral motion of the flooring component away from another flooring component when the first recessed portion is in counterpart engagement with the second recessed portion of the other flooring component, e.g. as described above. For example, the first recessed portion and the second recessed portion may be structured such that a portion of the flooring component body shaped by the first recessed portion and a portion of the flooring component body shaped by the second recessed portion form counterparts of an engagement mechanism in the flooring component body, e.g. of an engagement mechanism that inhibits lateral motion of the flooring component away from another flooring component when the portion of the flooring component body shaped by the first recessed portion engages the portion of another such flooring component body shaped by the second recessed portion of the other flooring component, for example as described above. The engagement mechanism may be a snap lock engagement mechanism and may inhibit vertical motion of the flooring component away from the other flooring component. In the present context, lateral motion may be understood as motion in a direction substantially parallel to a major face of the flooring component body and vertical motion may be understood as motion in a direction substantially perpendicular to a major face of the flooring component body.

One of the first and second recessed portions may define a male structure on the flooring component body, e.g. a structure having a shape of a ridge or knob, and the other of the first and second recessed portions may define a female structure into the flooring component body, e.g. a structure having a counterpart shape of a groove or hole. As such, the male structure may be termed a "protruding structure" and the female structure may be termed a "hollow structure." The male structure may have a shape that matingly engages the female structure. Similarly, the male structure may have a shape that snappingly engages the female structure. The male structure and the female structure may form the engagement mechanism counterparts, i.e. an engagement mechanism counterpart pair. The first recessed portion and the second recessed portion may define a plurality of such engagement mechanism counterpart pairs on/in the flooring component body. The plurality of engagement mechanism counterpart pairs may comprise engagement mechanism counterparts implementing differing engagement mechanisms. Each of the male/female structures may have a minimum dimension in a widthwise and/or lengthwise direction of the flooring component, e.g. as defined below, of at least one sixth or at least one fourth of a dimension of the respective first/second recessed portion in the widthwise direction of the flooring component. Each of the male/female structures may have a maximum dimension in a widthwise and/or lengthwise direction of the flooring component, e.g. as defined below, of no more than one third or no more than one half of a dimension of the respective first/second recessed portion in the widthwise direction of the flooring component.

The first recessed portion may define a first recessed region in the first major face. The engagement mechanism counterpart shaped into the flooring component body by the first recessed portion may be shaped into/onto the first recessed region. Similarly, the second recessed portion may define a second recessed region in the second major face. The engagement mechanism counterpart shaped into the flooring component body by the second recessed portion may be shaped into/onto the second recessed region.

The first recessed portion and the second recessed portion may be structured such that engagement/disengagement of the engagement mechanism counterparts shaped by the first and second recessed portions is effectible (only) in a direction in a range of ±10°, ±30° or ±45° of perpendicular to a major face of the flooring component. For example, the male/female structure may protrude/form a recess in a direction (substantially) perpendicular to a major face of the flooring component.

The male structure may be distanced from an (outermost) edge/side of the flooring component in a generally inward direction along a width of the flooring component, e.g. as defined below. The male structure may be offset/distanced from the aforementioned edge/side by at least 10% or at least 20% of a width of a first/second recessed region, as described above, onto which the male structure is formed. The male structure may be offset/distanced from the aforementioned edge/side by not more than 40%, not more than 50% or not more than 60% of a width of a first/second recessed region, as described above, onto which the male structure is formed. The width of the first/second recessed region may be measured in a direction of a width of the flooring component, e.g. as defined below. The remarks of this paragraph apply, mutatis mutandis, to the female structure.

One or both of the flooring component and the flooring component body may have a thickness in the range of 8 mm to 100 mm, e.g. in the range of 25 to 50 mm. The thickness of the flooring component (body) may be measured from the first major face of the flooring component body to the second major face of the flooring component body, e.g. in a region of maximum distance/thickness from the first major face to the second major face in a direction perpendicular to the first major face. Similarly, the thickness may be measured from a major side of a rectangular cuboid bounding box enclosing the flooring component body to an opposite major side of the bounding box in a direction perpendicular to the major sides.

The flooring component (body) may have a length in the range of 15 cm to 300 cm. Similarly, the flooring component (body) may have a length in the range of 2 m to 30 m. The length may be measured in a direction perpendicular to the thickness. For example, the length may be measured from a (distal) surface of a minor face of the flooring component body that extends from the first recessed portion to the second recessed portion to a (distal) surface of an opposite minor face of the flooring component body that likewise extends from the first recessed portion to the second recessed portion. Similarly, the length may be measured from a first minor side of a rectangular cuboid bounding box enclosing the flooring component body to a second, opposite minor side of the bounding box in a direction perpendicular to the minor sides, where each of the first minor side and the second minor side is a side adjacent to both the first recessed portion and the second recessed portion.

The flooring component (body) may have a width, e.g. as measured in a direction perpendicular to both the thickness and the length, in the range of 15 cm to 300 cm. For example, the width may be measured from a surface of a minor face of the flooring component body distal from the first recessed portion to a surface of an opposite minor face of the flooring component body distal from the second recessed portion or from a first minor side of a rectangular cuboid bounding box enclosing the flooring component body to a second, opposite minor side of the bounding box in a direction perpendicular to the minor sides, where the first minor side is a side adjacent solely to the first recessed portion and the second minor side is a side adjacent solely to the second recessed portion.

As discussed in further detail infra, the flooring component may be shaped such that, when an engagement structure of the flooring component is engaged with a (counterpart) engagement structure of another (such) flooring component, a gap is provided between a major surface of the flooring component and a (substantially) coplanar major surface of the other flooring component. For example, the engagement structure (e.g. a male/female structure) may be offset/distanced from an inner-lying minor lateral surface of the flooring component by at least 8 mm, at least 10 mm, at least 15 mm or at least 20 mm more than a counterpart engagement structure (e.g. a counterpart female/male structure) is offset/distanced from an opposite, outer-lying minor lateral surface of the flooring component. The inner-lying minor lateral surface may be a surface intermediate/interconnecting a major surface of a major face of the flooring component and a minor surface of said major face in the first recessed region, and the outer-lying minor lateral surface may be a surface intermediate/interconnecting said major surface and a minor surface in the second recessed region (opposite said major surface).

The first recessed portion may extend along at least 50%, at least 80% or an entirety of the first edge. Similarly, the second recessed portion may extend along at least 50%, at least 80% or an entirety of the second edge. The first recessed portion may occupy/extend over less than 30%, less than 20%, less than 10% or less than 5% of the width of the flooring component (body). Similarly, the second recessed portion may occupy/extend over less than 30%, less than 20%, less than 10% or less than 5% of the width of the flooring component (body). One or both of the first recessed portion and the second recessed portion may extend to a depth of/occupy at least 20% and at most 80% of a thickness of the flooring component (body). Similarly, one or both of the first recessed portion and the second recessed portion may extend to a depth of/occupy at least 30% and at most 70% of a thickness of the flooring component (body). Similarly, one or both of the first recessed portion and the second recessed portion may extend to a depth of/occupy at least 40% and at most 60% of a thickness of the flooring component (body).

The first recessed portion and the second recessed portion may be structured such that at least 50%, at least 80% or at least 90% of the first recessed region of the flooring component body abuts the second recessed region of the other flooring component body when a portion of the flooring component body shaped by the first recessed portion overlaps and engages a portion of the other flooring component body shaped by the second recessed portion of the other flooring component, for example as described above. The first recessed portion and the second recessed portion may be structured such that at least 50%, at least 60% or at least 75% of an area of the first/second recessed region is located in a central third or in a central fifth (of a thickness) of the flooring component (body), e.g. as defined supra.

The first/second recessed portion may have a width in a widthwise direction of the flooring component that differs from the width of the other of the first/second recessed portion in a widthwise direction of the flooring component, e.g. by an amount (substantially) equal to a dimension of the aforementioned gap (e.g. as measured in a widthwise direction of the flooring component). In other words, the respective widths of the first/second recessed portions may differ by at least 8 mm, at least 10 mm, at least 15 mm or at least 20 mm. For example, the first recessed portion may extend away from the (aforementioned) first edge of the first major surface in a direction of the (aforementioned) second edge of the second major surface by at least 8 mm, at least 10 mm, at least 15 mm or at least 20 mm farther than the second recessed portion extends away from the second edge in a direction of the first edge.

The first recessed region may have a surface having a shape that is a counterpart of a shape of a surface of the second recessed region. For example, an entire surface of the first recessed region may have a shape that is a counterpart shape of an entire surface of the second recessed region. A sum of a thickness of the flooring component body at the first recessed region and a (counterpart) thickness of the flooring component body at the second recessed region may (substantially) equal a thickness of the flooring component, e.g. when a portion of the flooring component body shaped by the first recessed portion overlaps and engages a portion of another flooring component body shaped by the second recessed portion of the other flooring component, for example as described above. In the present context, a "thickness" and "counterpart thickness" pair may be understood as respective thicknesses measured through neighboring points on adjacent surfaces of the first/second recessed region when a portion of the flooring component body shaped by the first recessed portion overlaps and engages a portion of another flooring component body shaped by the second recessed portion of another flooring component as described above. In the present context, "(substantially) equal" may be understood as being equal, as being equal to within 5% (of the larger value) or as being equal to within 10% (of the larger value). The above equation may hold for a plurality of measurement points on the first/second recessed region, e.g. for at least 80%, at least 90% or an entirety of an area of the first/second recessed region. The thickness of the flooring component body at the first recessed region may be a distance from (a surface of) the first recessed region to a portion of the second major face opposite the first recessed portion. Similarly, the thickness of the flooring component body at the first recessed region may be a distance from a plane defined by the second major face to (a surface of) the first recessed portion. The thickness of the flooring component body at the second recessed region may be a distance from (a surface of) the second recessed region to a portion of the first major face opposite the second recessed portion. Similarly, the thickness of the flooring component body at the second recessed region may be a distance from a plane defined by the first major face to (a surface of) the second recessed portion. The thickness may be measured in direction parallel to a thickness (direction) of the flooring component, e.g. as defined supra.

Design of the flooring component as described above enables counterparts of an engagement mechanism defined by the first recessed portion and the second recessed portion to be engageable/disengageable by a single pivotal motion of the one flooring component around an axis proximate to the second recessed portion of the one flooring component, e.g. an axis intersecting/collinear with a (corner) edge of the flooring component (most) distal/diagonally opposite from first recessed portion. Similarly, design of the flooring component as described above enables counterparts of an engagement mechanism defined by the first recessed portion and the second recessed portion to be engageable/disengageable by a single pivotal motion of the one flooring component around an axis proximate to the first recessed portion of the one flooring component, e.g. an axis intersecting/collinear with a (corner) edge of the flooring component (most) distal/diagonally opposite from second recessed portion. The axis may extend in a lengthwise direction of the flooring component, e.g. in a direction perpendicular, in a range of ±10° of perpendicular or in a range of ±20° of perpendicular to a minor lateral side of a bounding box enclosing the flooring component. The engagement/disengagement may comprise engagement/disengagement of male/female structures and/or of counterparts of an engagement mechanism defined by the first/second recessed portions.

Fourth General Description

The flooring component of the present disclosure, e.g. as described in the first, second or third general descriptions supra, may likewise be described in terms of a flooring component comprising a main body portion, a first extending portion and a second extending portion.

The flooring component may comprise a main body portion defining a first major surface and a second major surface. The main body portion may define the first major surface on a side of the flooring component opposite a side of the flooring component on which the main body portion defines the second major surface.

The first/second major surface may constitute a (lower) surface that abuts the floor when the flooring component is laid on the floor with other such flooring components to form flooring. Similarly, the other of the first/second major surface may constitute a(n upper) flooring surface when the flooring component is laid on the floor with other such flooring components to form flooring.

One or each of the first and second major surfaces may define bounds of a rectangular cuboid bounding box of the main body portion, e.g. bounds of a respective major side of the bounding box. One or each of the first and second major surfaces may be defined by one or more surfaces (substantially) coplanar to a respective major side of a rectangular cuboid bounding box of the main body portion.

Each of the two major sides of a rectangular cuboid bounding box of the main body portion may have an area at least five, at least ten or at least twenty times greater than the area of any other (non-major) side of the bounding box as measured in orthogonal projection. One or each of the first and second major surfaces may have an area of at least 30%, at least 40%, at least 60%, at least 80% or (substantially) 100% of the area of a corresponding (major) side of a rectangular cuboid bounding box of the main body portion as measured in orthogonal projection.

One or each of the first and second major surfaces may be a (substantially) planar surface, e.g. a surface that fits entirely between two parallel planes separated by no more than 5 mm, 10 mm or 20 mm, for example.

One or each of the first and second major surfaces may be a contiguous surface. One or each of the first and second major surfaces may be a surface that constitutes an entirety of a respective side of the main body portion. For example, the main body portion may have a shape of a rectangular cuboid or a shape substantially that of a rectangular cuboid, e.g. comprising one or more rounded or beveled corners, a respective side of the main body portion forming the first/second major surface.

Similarly, one or each of the first and second major surfaces may be a disjointed surface, i.e. be defined by a plurality of disjointed surfaces. For example, the main body portion may comprise a plurality of grooves that disjoin neighboring regions of the first/second major surface. The grooves may be formed and arranged to channel dirt and/or liquids away from the first/second major surface. Similarly, the main body portion may comprise two or more layers of generally tubular structures arranged in parallel, the generally tubular structures of each layer being arranged (substantially) parallel to the generally tubular structures of adjacent layers. In other words, the main body portion may have a structure akin to so-called "waffle fries." Such structures weigh significantly less and require significantly less structural material than a solid structure defining similarly sized first and second major surfaces, while also allowing dirt and liquids to be transported away from the first/second major surface.

One or each of the first and second major surfaces may extend (in a first direction) an entire distance from a first side of the main body portion to a second side of the main body portion opposite the first side of the main body portion. Similarly, one or each of the first and second major surfaces may extend (in a second direction perpendicular to the first direction) an entire distance from a third side of the main body portion to a fourth side of the main body portion opposite the third side of the main body portion.

The flooring component may comprise a first extending portion that extends from the main body portion in a first direction. The first direction may be substantially parallel to (a plane defined by) the first major surface or to a major side of a rectangular cuboid bounding box of the main body portion. Similarly, the first direction may be orthogonal to a non-major side of a rectangular cuboid bounding box of the main body portion.

The first extending portion may define a third surface. The third surface may have a form and arrangement that extends the first major surface in form and function. For example, the third surface may be coplanar to at least a portion or to an entirety of the first major surface.

The flooring component may comprise a second extending portion that extends from the main body portion in a second direction, which second direction may be opposite to the first direction. The second direction may be substantially parallel to (a plane defined by) the first major surface or to a major side of a rectangular cuboid bounding box of the main body portion. Similarly, the second direction may be orthogonal to a non-major side of a rectangular cuboid bounding box of the main body portion.

The second extending portion may define a fourth surface. The fourth surface may have a form and arrangement that extends the second major surface in form and function. For example, the fourth surface may be coplanar to at least a portion or to an entirety of the second major surface.

One or each of the third and fourth surfaces may be a (substantially) planar surface, e.g. a surface that fits entirely between two parallel planes separated by no more than 5 mm, 10 mm or 20 mm, for example.

One or each of the third and fourth surfaces may be a contiguous surface. The third surface may be a (major) surface that constitutes an entirety of a respective side of the first extending portion. Similarly, the fourth surface may be a (major) surface that constitutes an entirety of a respective side of the second extending portion. For example, the first/second extending portion may have a shape of a rectangular cuboid or a shape substantially that of a rectangular cuboid, e.g. comprising one or more rounded or beveled corners, a respective side of the first/second extending portion forming the third/fourth surface.

Similarly, one or each of the third and fourth surfaces may be a disjointed surface, i.e. be defined by a plurality of disjointed surfaces. For example, the first extending portion may comprise a plurality of grooves that disjoin neighboring regions of the third surface. Similarly, the second extending portion may comprise a plurality of grooves that disjoin neighboring regions of the fourth surface. The grooves may be formed and arranged to channel dirt and/or liquids away from the third/fourth surface. Similarly, one or each of the first/second extending portions may comprise two or more layers of generally tubular structures arranged in parallel, the generally tubular structures of each layer being arranged (substantially) parallel to the generally tubular structures of adjacent layers. In other words, one or each of the first/second extending portions may have a structure akin to so-called "waffle fries." Such structures weigh significantly less and require significantly less structural material than a solid structure defining similarly sized first/second extending portions, while also allowing dirt and liquids to be transported away from the third/fourth surface.

The third surface may extend (in a first direction) an entire distance from a first side of the first extending portion to a second side of the first extending portion opposite the first side of the first extending portion. Similarly, the third surface may extend (in a second direction perpendicular to the first direction) an entire distance from a third side of the first extending portion to a fourth side of the first extending portion opposite the third side of the first extending portion. Likewise, the fourth surface may extend (in a first direction) an entire distance from a first side of the second extending portion to a second side of the second extending portion opposite the first side of the second extending portion. Similarly, the fourth surface may extend (in a second direction perpendicular to the first direction) an entire distance from a third side of the second extending portion to a fourth side of the second extending portion opposite the third side of the second extending portion.

The first extending portion may extend from a first edge of the main body portion and the second extending portion may extend from a second, diagonally opposite edge of the main body portion. The first extending portion may be structured to overlap and engage the second extending portion of another such flooring component, e.g. when the flooring component and the other flooring component are arranged such that a minor face of the flooring component at/proximate to the first edge of the main body portion of the flooring component is adjacent to/abuts a minor face of the other flooring component at/proximate to the second edge of the main body portion of the other flooring component and (a major surface of) a major face of the flooring component and (a major surface of) a major face of the other flooring component are coplanar.

The first extending portion may have a cross-section that is a counterpart of a cross-section of the second extending portion, e.g. along a planar cross-section through the first and second extending portions perpendicular to a major face or to both a major and a minor face of the flooring component. One or both of the first and second extending portions may have substantially a shape of a rectangular cuboid excepting portions/structures that define counterparts of an engagement mechanism, e.g. as discussed infra.

The first extending portion and the second extending portion may define counterparts of an engagement mechanism, e.g. of an engagement mechanism that inhibits lateral motion of the flooring component away from another flooring component when the first extending portion is in counterpart engagement with the second extending portion of the other flooring component, e.g. as described above. The engagement mechanism may be a snap lock engagement mechanism and may inhibit vertical motion of the flooring component away from the other flooring component. In the present context, lateral motion may be understood as motion in a direction substantially parallel to a major face of the flooring component/main body portion and vertical motion may be understood as motion in a direction substantially perpendicular to a major face of the flooring component/main body portion.

One of the first and second extending portions may comprise a male structure, e.g. a structure having a shape of a ridge or knob, and the other of the first and second extending portions may comprise a female structure, e.g. a structure having a counterpart shape of a groove or hole. As such, the male structure may be termed a "protruding structure" and the female structure may be termed a "hollow structure." The male structure may have a shape that matingly engages the female structure. Similarly, the male structure may have a shape that snappingly engages the female structure. The male structure and the female structure may form the engagement mechanism counterparts, i.e. an engagement mechanism counterpart pair. The first extending portion and the second extending portion may define a plurality of such engagement mechanism counterpart pairs on/in the flooring component. The plurality of engagement mechanism counterpart pairs may comprise engagement mechanism counterparts implementing differing engagement mechanisms. Each of the male/female structures may have a minimum dimension in a widthwise and/or lengthwise direction of the flooring component, e.g. as defined below, of at least one sixth or at least one fourth of a dimension of the respective first/second extending portion in the widthwise direction of the flooring component. Each of the male/female structures may have a maximum dimension in a widthwise and/or lengthwise direction of the flooring component, e.g. as defined below, of no more than one third or no more than one half of a dimension of the respective first/second extending portion in the widthwise direction of the flooring component.

The first extending portion may comprise a first face. The first face may be on a side of the first extending portion opposite the third surface. The first face may face in a direction perpendicular to a major face of the flooring component. For example, the first face may be an upward-facing face (that faces in an upward direction) or a downward-facing face (that faces in a downward direction). The engagement mechanism counterpart comprised by the first extending portion may be formed onto/into the first face.

Similarly, the second extending portion may comprise a second face. The second face may be on a side of the second extending portion opposite the fourth surface. The first and second faces may face in opposite directions. As such, the second face may face in a direction perpendicular to a(nother) major face of the flooring component and may be an upward-facing face (that faces in an upward direction) or a downward-facing face (that faces in a downward direction). For example, the second face may be an upward-facing face if the first face is a downward-facing face or a downward-facing face if the first face is an upward-facing face. The engagement mechanism counterpart comprised by the second extending portion may be formed onto/into the second face.

The first extending portion and the second extending portion may be structured such that engagement/disengagement of the engagement mechanism counterparts formed onto/into the first and second extending portions is effectible (only) in a direction in a range of ±10°, ±30° or ±45° of perpendicular to a major face of the flooring component. For example, the male/female structure may protrude/form a recess in a direction (substantially) perpendicular to a major face of the flooring component.

The male structure may be distanced from an (outermost) edge/side of the flooring component in a generally inward direction along a width of the flooring component, e.g. as defined below. The male structure may be offset/distanced from the aforementioned edge/side by at least 10% or at least 20% of a width of a first/second extending portion, as described above, onto which the male structure is formed. The male structure may be offset/distanced from the afore-mentioned edge/side by not more than 40%, not more than 50% or not more than 60% of a width of a first/second extending portion, as described above, onto which the male structure is formed. The width of the first/second extending portion may be measured in a direction of a width of the flooring component, e.g. as defined below. The remarks of this paragraph apply, mutatis mutandis, to the female structure.

The flooring component may have a thickness in the range of 8 mm to 100 mm, e.g. in the range of 25 to 50 mm. The thickness may be measured from the first major surface of the main body portion to the second major surface of the main body portion, e.g. in a region of maximum distance/thickness from the first major surface to the second major surface in a direction perpendicular to the first major surface. Similarly, the thickness may be measured from a major side of a rectangular cuboid bounding box enclosing the flooring component to an opposite major side of the bounding box in a direction perpendicular to the major sides.

The flooring component may have a length in the range of 15 cm to 300 cm. Similarly, the flooring component (body) may have a length in the range of 2 m to 30 m. The length may be measured in a direction perpendicular to the thickness. For example, the length may be measured from a (distal) surface of a minor face of the flooring component that extends from the first extending portion across the main body portion to the second extending portion to a (distal) surface of an opposite minor face of the flooring component that likewise extends from the first extending portion across the main body portion to the second extending portion. Similarly, the length may be measured from a first minor side of a rectangular cuboid bounding box enclosing the flooring component to a second, opposite minor side of the bounding box in a direction perpendicular to the first/second minor side, where each of the first and second minor sides is a side adjacent to the first extending portion, the main body portion and the second extending portion.

The flooring component may have a width, e.g. as measured in a direction perpendicular to both the thickness and the length, in the range of 15 cm to 300 cm. For example, the width may be measured from a surface of a minor face of the flooring component distal from the first extending portion to a surface of an opposite minor face of the flooring component distal from the second extending portion or from a first minor side of a rectangular cuboid bounding box enclosing the flooring component to a second, opposite minor side of the bounding box in a direction perpendicular to the minor sides, the first minor side being a side adjacent solely to the first of the first and second extending portions and the second minor side being a side adjacent solely to the second of the first and second extending portions. Similarly, the length may be measured from a surface of the first extending portion distal from the main body portion to a surface of the second extending portion distal from the main body portion.

As discussed in further detail infra, the flooring component may be shaped such that, when an engagement structure of the flooring component is engaged with a (counterpart) engagement structure of another (such) flooring component, a gap is provided between a major surface of the flooring component and a (substantially) coplanar major surface of the other flooring component. For example, the engagement structure (e.g. a male/female structure) may be offset/distanced from an inner-lying minor lateral surface of the flooring component by at least 8 mm, at least 10 mm, at least 15 mm or at least 20 mm more than a counterpart engagement structure (e.g. a counterpart female/male structure) is offset/distanced from an opposite, outer-lying minor lateral surface of the flooring component. The inner-lying minor lateral surface may be a surface intermediate/interconnecting the (aforementioned) second face and third surface, and the outer-lying minor lateral surface may be a surface intermediate/interconnecting the (aforementioned) second face and fourth surface. Similarly, the inner-lying minor lateral surface may be a surface intermediate/interconnecting the first face and fourth surface, and the outer-lying minor lateral surface may be a surface intermediate/interconnecting the first face and third surface.

The first extending portion may extend along at least 50%, at least 80% or an entirety of a length of the main body portion, e.g. along the first edge of the main body portion. Similarly, the second extending portion may extend along at least 50%, at least 80% or an entirety of a length of the main body portion, e.g. along the second edge of the main body portion. The first extending portion may constitute/extend over less than 30%, less than 20%, less than 10% or less than 5% of the width of the flooring component. Similarly, the second extending portion may constitute/extend over less than 30%, less than 20%, less than 10% or less than 5% of the width of the flooring component.

One or both of the first extending portion and the second extending portion may have a maximal thickness of less than 80% of a thickness of the flooring component and may have a minimal thickness of at least 20% of a thickness of the flooring component, e.g. as defined supra. Similarly, one or both of the first extending portion and the second extending portion may have a maximal thickness of less than 70% of a thickness of the flooring component and may have a minimal thickness of at least 30% of a thickness of the flooring component. Similarly, one or both of the first extending portion and the second extending portion may have a maximal thickness of less than 60% of a thickness of the flooring component and may have a minimal thickness of at least 40% of a thickness of the flooring component. The maximal/minimal thickness of the first/second extending portion may be measured in direction parallel to a thickness (direction) of the flooring component, e.g. as defined supra, and may be measured at a location of the male/female structure.

The first extending portion and the second extending portion may be structured such that at least 50%, at least 80% or at least 90% (of the first face) of the first extending portion of the flooring component abuts (the second face of) the second extending portion of the other flooring component when the first extending portion overlaps and engages the second extending portion of the other flooring component, for example as described above. The first extending portion and the second extending portion may be structured and arranged such that at least 50%, at least 60% or at least 75% of an area of the first/second face is located in a central third or in a central fifth (of a thickness) of the flooring component, e.g. as defined supra.

The first/second extending portion may have a width in a widthwise direction of the flooring component that differs from the width of the other of the first/second extending portion in a widthwise direction of the flooring component, e.g. by an amount (substantially) equal to a dimension of the aforementioned gap (e.g. as measured in a widthwise direction of the flooring component). In other words, the respective widths of the first/second extending portions may differ by at least 8 mm, at least 10 mm, at least 15 mm or at least 20 mm. For example, the first extending portion may extend in the (aforementioned) first direction from the main body portion by at least 8 mm, at least 10 mm, at least 15 mm or at least 20 mm farther than the second extending portion extends in the (aforementioned) second direction from the main body portion.

The first face may have a surface having a shape that is a counterpart of a shape of a surface of the second face. For example, an entire surface of the first face may have a shape that is a counterpart shape of an entire surface of the second face. A sum of a thickness of the first extending portion and a (counterpart) thickness of the second extending portion may (substantially) equal a thickness of the flooring component, e.g. when the first extending portion of the flooring component overlaps/engages the second extending portion of another flooring component, for example as described above. In the present context, a "thickness" and "counterpart thickness" pair may be understood as respective thicknesses measured through neighboring points on adjacent surfaces of the first/second extending portions when the flooring component overlaps/engages another flooring component as described above. In the present context, the expression "(substantially) equal" may be understood as being equal, as being equal to within 5% (of the larger value) or as being equal to within 10% (of the larger value). The above equation may hold for a plurality of measurement points on the first/second face, e.g. for at least 80%, at least 90% or an entirety of an area of the first/second face. The thickness of the first extending portion may be a distance from the third surface defined by the first extending portion to (a fifth surface defining a portion of) the first face. Similarly, the thickness of the first extending portion may be a distance from a plane defined by the third surface or the first major surface to (the fifth surface defining a portion of) the first face. The thickness of the second extending portion may be a distance from the fourth surface defined by the second extending portion to (a sixth surface defining a portion of) the second face. Similarly, the thickness of the second extending portion may be a distance from a plane defined by the fourth surface or the second major surface to (the sixth surface defining a portion of) the second face. The thickness of the first/second extending portion may be measured in direction parallel to a thickness (direction) of the flooring component, e.g. as defined supra.

One or both of the first extending portion and the second extending portion may form a unitary structure with the main body portion. In other words, the flooring component may be a unitary structure comprising/consisting of the main body portion, the first extending portion and the second extending portion.

Design of the flooring component as described above enables the first extending portion of one flooring component to be engageable/disengageable from the second extending portion of another flooring component by a single pivotal motion of the one flooring component around an axis proximate to the second extending portion of the one flooring component, e.g. an axis intersecting/collinear with a (corner) edge of the flooring component (most) distal/diagonally opposite from first extending portion. Similarly, design of the flooring component as described above enables the second extending portion of one flooring component to be engageable/disengageable from the first extending portion of another flooring component by a single pivotal motion of the one flooring component around an axis proximate to the first extending portion of the one flooring component, e.g. an axis intersecting/collinear with a (corner) edge of the flooring component (most) distal/diagonally opposite from second extending portion. The axis may extend in a lengthwise direction of the flooring component, e.g. in a direction perpendicular, in a range of ±10° of perpendicular or in a range of ±20° of perpendicular to a lengthwise side of a bounding box (i.e. at the respective lengthwise ends of the bounding box) enclosing the flooring component. The engagement/disengagement may comprise engagement/disengagement of male/female structures of the first/second extending portions and/or engagement/disengagement of counterparts of an engagement mechanism defined by the first/second extending portions.

Further General Remarks

The general remarks of this section apply to any flooring component of the present disclosure.

The flooring component (body) may have a length that is a natural number fraction of a length equal to the length of a floor of a standardized cargo container minus (a relaxation amount) in the range of 1 to 5 cm, in the range of 1 to 10 cm or in the range of 1 to 20 cm. The natural number of the natural number fraction may be in the range of 1 to 10, e.g. in the range of 1 to 4. The relaxation amount may simplify installation/repair of flooring employing the flooring component by loosening fitting and preventing jamming during installation/repair. Similarly, the flooring component (body) may have a width that is a natural number fraction of a width equal to the width of a floor of a standardized cargo container minus (a relaxation amount) in the range of 1 to 5 cm, in the range of 1 to 10 cm or in the range of 1 to 20 cm. The natural number of the natural number fraction may be in the range of 4 to 15.

The ratio of thickness to width of the flooring component (body) may be in the range of 1:10 to 1:30. The ratio of length to width may be in the range of 1:4 to 4:1. Similarly, the ratio of width to length may be in the range of 1:1 to 1:100. The flooring component (body) may be embodied in a half-width or a half-length embodiment having half the width/length specified above. Similarly, the flooring component (body) may be embodied in a three-halves-width or a three-halves-length embodiment having one and one half the width/length specified above. Such half-width/half-length/three-halves-width/three-halves-length embodiments allow for offset tiling of a plurality of flooring components without requiring more than two embodiments of the flooring components.

The flooring component may comprise a resilient portion, e.g. in a region of (the male/female structure of) the engagement mechanism or in a region of the (aforementioned) first/second engagement structure. For the sake of succinctness, the following discussion of the resilient portion uses the term "engagement structure" to designate the (respective) first engagement structure/second engagement structure/male structure/female structure.

In the present context, the expression "in a region" may be understood in the sense that a (deforming) portion or an entirety of the resilient portion is less distant from the engagement structure than a (half/quarter) thickness of the flooring component, e.g. a thickness as described hereinbelow. Similarly, the expression "in a region" may be understood in the sense that a (deforming) portion or an entirety of the resilient portion is less distant from the engagement structure than a (half/quarter) width of the engagement structure, i.e. a dimension of the engagement structure in a widthwise (e.g. as described hereinbelow) direction of the flooring component.

In the present context, the expression "deforming portion" may be understood in the sense of a portion of the resilient portion that, during engagement/disengagement of the flooring component to/from another flooring component, is (temporarily/elastically) deformed by a counterpart engagement structure of the other flooring component. Engagement/disengagement of the flooring component to/from another flooring component may comprise/necessitate (temporarily/elastically) deforming (a deforming portion of) the resilient portion (by compression). The "resilience" of the resilient portion may encompass such an ability of the resilient portion to (temporarily/elastically) deform. In this respect, the engagement structure may use/be of a shape that uses the resilience of the resilient portion to (snappingly) engage/disengage from a counterpart engagement structure, e.g. of another flooring component, for example when the flooring component is pivoted to engage another flooring component as described infra. For example, the first recessed portion of a flooring component may be engageable to/disengageable from the second recessed portion of another flooring component by a resilience of the resilient portion (of the flooring component) and a (single) pivotal motion of the flooring component body (of the flooring component) around an axis proximate to the second recessed portion (of the other flooring component).

The resilient portion may separate the engagement structure from a remainder of the flooring component. For example, the resilient portion may form a trench/U-shaped region between (a base of) the engagement structure and (an adjacent portion of) the flooring component. Furthermore, the resilient portion may constitute at least a portion of a surface of the engagement structure. For example, the resilient portion may constitute at least 30% or at least 50% of a surface of the engagement structure. The resilient portion may extend from a surface of the engagement structure to a depth of at least an eighth, a quarter or half of a width of the engagement structure, i.e. a dimension of the engagement structure in a widthwise (e.g. as described hereinbelow) direction of the flooring component. Similarly, the resilient portion may constitute an entirety of the engagement structure, e.g. an entirety of a structure projecting from the flooring component to form the engagement structure. The resilient portion may be shaped so as extend across less than 80% or less than 60% of the flooring component (body) in a thickness direction.

As stated above, the engagement structure may use/be of a shape that uses the resilience of the resilient portion to (snappingly) engage/disengage from a counterpart engagement structure. The resilient portion may comprise/constitute a bulge, e.g. a dot-shaped, annular or linear bulge, of the engagement structure. The bulge may interact with (a bulge of) a counterpart engagement structure of another flooring component during engagement/disengagement of the flooring component to/from the other flooring component. The interaction may comprise a (temporary/elastic) deforming of the bulge (during the engagement/disengagement), e.g. by compression of the bulge by the other flooring component. Similarly, the bulge may engage (a corresponding hollow of) a counterpart engagement structure of another flooring component, e.g. to inhibit disengagement of the flooring component from the other flooring component and/or to provide the "snap" of the snap lock engagement mechanism. Engagement/disengagement of the flooring component to/from another flooring component may comprise/necessitate (temporarily/elastically) deforming the bulge.

The flooring component (body) may be manufactured of any (e.g. one, at least two or each) of a plastic material, a recycled plastic material, a rubber material, a wood plastic composite and a (glass) fiber reinforced plastic composite. For example, the flooring component (body) may be manufactured primarily of a recycled plastic material, comprising a rubber layer solely on a major face/surface, e.g. to improve grip. The flooring component (body) may exhibit a constant cross-section along its width. The flooring component (body) may be a solid structure, i.e. a structure without internal cavities. Similarly, the flooring component (body) may comprise at least one (internal) cavity. For example, the flooring component (body) may comprise at least one passage that extends in a lengthwise direction of the flooring component (body) through an entirety of the flooring component (body), i.e. from a first lengthwise end surface of the flooring component (body) to a second, opposite lengthwise end surface of the flooring component (body). The passage may be a closed cavity except at the opposite lengthwise end surfaces of the flooring component (body). A wall of the passage adjacent a major face of the flooring component (body) may be V-shaped, e.g. to facilitate fluid runoff. The V-shaped wall may be adjacent a major face opposite the major surface at which the (aforementioned) gap is provided. The passages may constitute between 25% and 75% of a volume of the flooring component (body).

The flooring component (body) may comprise/consist of a first material and a second material. For example, at least 60%, at least 80%, at least 90% or at least 95% of the flooring component (body) may be of a first material, e.g. as measured by volume. The resilient portion may be of a second material, e.g. a material more pliable than the first material (at 20° C.). An entirety of the flooring component (body) excepting the resilient portion (in a region of the first/second engagement structure) may be of the first material. The first material may be a material selected from the group consisting of a plastic material and a composite material, where the plastic material may be a recycled plastic material and the composite material may comprise/consist of a plastic material and/or a recycled plastic material in combination with any material selected from the group consisting of wood, glass fibers and carbon fibers. The second material may be an elastomer.

The resilient portion may be integrally formed/integral with the flooring component (body), e.g. by coextrusion. For example, the resilient portion may be integrally formed/integral with the (aforementioned) first/second extending portion. The resilient portion may be integrally formed in/integral with the first material, e.g. by coextrusion. For example, the resilient portion may be formed by coextrusion of the (second) material constituting the resilient portion and the (first) material constituting the remainder of the flooring component (body).

The resilient portion may be distinct/separable from (the remainder of) the flooring component (body). Similarly, the resilient portion may be distinct/separable from the (first) material constituting the remainder of the flooring component (body). The flooring component (body) may comprise a hollow/groove for receiving the resilient portion, e.g. a hollow/groove in the (aforementioned) first/second extending portion. The hollow/groove may extend an entire length of the flooring component (body). The flooring component (body) and the resilient portion may comprise (counterpart) fastening structures, e.g. tongue and groove or barb and ledge, for (releasably) securing the resilient portion in (the hollow/groove of) the flooring component (body). A portion of the resilient portion may have a counterpart shape of the hollow/groove. For example, the resilient portion may consist of a first portion have a counterpart shape of the hollow/groove and a second (projecting) portion constituting an engagement structure of the flooring component. Similarly, the resilient portion may consist of a first portion having a shape that (snappingly) engages (a shape of) the hollow/groove and a second (projecting) portion constituting an engagement structure of the flooring component.

The resilient portion may be configured relative to the counterpart fastening and engagement structures of the flooring component (body) to attach more securely to the counterpart fastening structure than to (a structure having the shape of) the counterpart engagement structure. In other words, the resilient portion (and the flooring component (body)) may be configured such that, during disengagement of the flooring component body from another flooring component body, e.g. as described in the present disclosure, the resilient portion disengages from the other flooring component body without becoming unfastened from (the counterpart fastening structure (formed by the hollow/groove of) the flooring component body.

The flooring component (body) may comprise a third material, e.g. a material that is less abrasive, less hard or otherwise easier to drill than the (aforementioned) first material. The third material may be a material selected from the group consisting of a plastic material, a recycled plastic material and an elastomer. The third material may be provided intermediate a passage (as described supra and at least one major surface of the flooring component body, e.g. (solely) intermediate the passage and the major surface at which the gap is provided. The flooring component (body) may comprise a bore, e.g. a bore through the third material, for example from the major surface at which the gap is provided to the passage.

As touched upon above, any male structure may have a shape of a ridge or knob, and any female structure may have a (counterpart) shape of a groove or hole. For example, any male structure may be a protrusion having a (general) shape of a finger, a (right circular) cylinder or a rectangular cuboid, and any female structure may be a hollow having a (counterpart) shape of a finger, a (right circular) cylinder or a rectangular cuboid. Similarly, any of the male/female structures may have a shape of a tongue and groove, respectively.

Any of the male and female structures may comprise a resilient structure, e.g. a resilient structure that is resiliently dislocated by the other of the counterpart pair during an engaging/disengaging motion of the engagement mechanism counterparts relative to one another. The resilient dislocation may provide the "snap" of the snap lock engagement mechanism. Interaction of the resilient structures may prevent disengagement of a male structure from a counterpart female structure and may thus contribute to securing one flooring element to another flooring element (when in engagement). The resilience of the resilient structure may be provided by the material and/or the shape of the resilient structure. For example, the resilient structure may be a cantilever structure or a bulge, e.g. a dot-shaped, annular or linear bulge.

The male/females structures may comprise male/females structures at a (widthwise) end of the flooring component that are offset from (counterpart) male/females structures at an opposite (widthwise) end of the flooring component in a lengthwise direction by half a length of the flooring component, e.g. to simplify installation in a pattern where each row of flooring components is offset in a lengthwise direction by half a length relative to the flooring components of the adjacent rows.

The flooring component may comprise a hollow for engageably receiving a hook, e.g. for pulling up an end of the flooring component to pivot the flooring component out of engagement with adjacent flooring components. Similarly, the flooring component may comprise an hollow at an end of the flooring component, which hollow allows insertion of a prying device through to an underside of the flooring component, e.g. for prying up an end of the flooring component to pivot the flooring component out of engagement with adjacent flooring components.

One or both lengthwise faces of the flooring component (i.e. at the respective lengthwise ends of the flooring component) may comprise a planar surface coplanar to a lengthwise side of a bounding box (i.e. at the respective lengthwise ends of the bounding box) enclosing the flooring component. An entirety of one or both lengthwise faces of the flooring component may be coplanar to a lengthwise side of a bounding box enclosing the flooring component.

The flooring component may be shaped such that, when an engagement structure of the flooring component is engaged with a (counterpart) engagement structure of another (such) flooring component, a gap is provided between a major surface of the flooring component and a (substantially) coplanar major surface of the other flooring component. The engagement structure may be a first/second engagement structure as described above. Similarly, the engagement structure may be a (male/female) structure of the engagement mechanism. The gap may have a minimum dimension of at least 8 mm, at least 10 mm, at least 15 mm or at least 20 mm, e.g. as measured from the major surface of the flooring component to the (substantially) coplanar major surface of the other flooring component. The gap may have a minimum dimension, e.g. as measured from the major surface of the flooring component to the (substantially) coplanar major surface of the other flooring component, within the range of 30% to 70%, e.g. within the range of 40% to 60%, of a thickness of the flooring component. The gap may have a depth, e.g. as measured in a thickness direction of the flooring component (from the major surface of the flooring component), of at least a quarter, at least a third or at least half of a thickness of the flooring component. The gap may extend in a thickness direction of the flooring component from the major surface of the flooring component to (a surface of) the other flooring component (when the engagement structure of the flooring component is engaged with the (counterpart) engagement structure of the other flooring component). The gap may extend along an entire length of the flooring component (when the engagement structure of the flooring component is engaged with the (counterpart) engagement structure of the other flooring component). The terms thickness and length may be understood as described supra.

The flooring component may comprise a (first) bevel that interconnects/at a corner of an outer-lying minor lateral surface of the flooring component and a minor face of the flooring component comprising an engagement structure. The (first) bevel may be of a shape and size for receiving a prying tool, e.g. a prying tool for disengaging the flooring component from another such flooring component, i.e. for prying the flooring component at the (first) bevel so as to disengage an engagement structure of the flooring component from a counterpart engagement structure of the other flooring component. The flooring component may comprise a (second) bevel that interconnects/at a corner of an innerlying minor lateral surface of the flooring component and a major face of the flooring component. The first and second bevels may be at diagonally opposite corners of a groove formed by the gap.

General Description of Manufacture

The flooring component of the present disclosure may be manufactured using molding and/or extruding techniques.

The flooring component may be manufactured by feeding a material, e.g. a plastic material, a recycled plastic material, or a wood plastic composite, into a mold chamber having a shape that forms the material into a flooring component (body)/resilient portion as described in the present disclosure. In the case of a molding of material into a flooring component (body), the material may comprise/be the (aforementioned) first material (for forming at least 60% of the flooring component). In the case of a molding of material into a resilient portion, the material may be the (aforementioned) second material (for forming the resilient portion). Since the second material may more pliable than the first material, a molded product of the second material may be termed a "pliable element."

An injection molding apparatus in accordance with the present disclosure may comprise a mold having a mold chamber, and an injection apparatus that injects a fluid material into the mold chamber, wherein the mold chamber is shaped to form a flooring component (body) as described in the present disclosure, i.e. a flooring component (body) having features/structures as described in the present disclosure. Similarly, an injection molding apparatus in accordance with the present disclosure may comprise a mold having a mold chamber, and an injection apparatus that injects a fluid material into the mold chamber, wherein the mold chamber is shaped to form a resilient portion as described in the present disclosure, i.e. a resilient portion having features/structures as described in the present disclosure. The apparatus may comprise a cooling system that (actively) cools the material in the mold chamber.

A molding apparatus in accordance with the present disclosure may comprise a mold defining a mold chamber, and an apparatus that feeds a material into the mold chamber, wherein the mold chamber is shaped to form a flooring component (body)/resilient portion as described in the present disclosure, i.e. a flooring component (body)/resilient portion having features/structures as described in the present disclosure. The molding apparatus may be a continuous molding apparatus with a caterpillar mold as generally known from the art of molding corrugated tubes. Specifically, the mold may comprise a plurality of partial mold chambers connected to form of one or more belts. The apparatus may comprise a drive mechanism that drives the belts such that the partial mold chambers close around the (continuous feed of) material fed into the mold, i.e. into a mold chamber defined by the partial mold chambers. The apparatus may comprise a cutting mechanism that sections the (continuous strip of) molded material into individual flooring components having a length/width as described in the present disclosure.

A method of manufacturing a flooring component (body)/resilient portion in accordance with the present disclosure may comprise feeding a material into a mold having a mold chamber, wherein the mold chamber is shaped to form a flooring component (body)/resilient portion as described in the present disclosure, i.e. a flooring component (body)/resilient portion having features/structures as described in the present disclosure. The method may be an injection molding method. The feeding may comprise injecting the material into the mold. The material may be a fluid upon injection into the mold chamber. The method may comprise (actively) cooling the material in the mold.

The mold chamber of the (injection) molding apparatus/(injection molding) method may have a shape that forms a tile or pallet having a first engagement structure at a first edge and a second engagement structure at a second, diagonally opposite edge, a tile/pallet having a first overlap portion and a second overlap portion, a flooring component body comprising a first recessed portion and a second recessed portion, or a flooring component comprising a main body portion, a first extending portion and a second extending portion. Having regard for the detail of the description of the flooring component elsewhere in the present disclosure, the shape of the mold chamber will not be described in detail. The person skilled in the art can readily derive the shape of the mold chamber from the detailed description of the flooring component (body)/resilient portion, the mold chamber having a shape inverse to the shape of the flooring component (body)/resilient portion notwithstanding tolerances known in the field of (injection) molding.

The flooring component may be manufactured by extruding a material, e.g. a plastic material, a recycled plastic material, or a wood plastic composite, through a die having a shape that forms the material into a flooring component (body)/resilient portion as described in the present disclosure. In the case of an extrusion/coextrusion of material(s) into a flooring component (body), the material may comprise/be the (aforementioned) first material (for forming at least 60% of the flooring component). In the case of an extrusion of material into a resilient portion, the material may be the (aforementioned) second material (for forming the resilient portion). Since the second material may more pliable than the first material, an extruded product of the second material may be termed a "pliable element."

An extruding apparatus in accordance with the present disclosure may comprise a die, and a drive mechanism that drives a material through the die, wherein the die is shaped to form a flooring component (body)/resilient portion as described in the present disclosure, i.e. a flooring component (body)/resilient portion having features/structures as described in the present disclosure. The drive mechanism may comprise a hydraulic drive mechanism.

Similarly, an extruding apparatus in accordance with the present disclosure may comprise a die system, a first drive mechanism and a second drive mechanism. The die system may comprise at least one die. At least one die of the die system may be shaped to form a flooring component (body) as described in the present disclosure, i.e. a flooring component (body) having features/structures as described in the present disclosure. At least one (other) die of the die system may be shaped to form a resilient portion as described in the present disclosure, i.e. a resilient portion having features/ structures as described in the present disclosure. The first drive mechanism may drive a first material e.g. the first material (for forming at least 60% of the flooring component) described supra. The second drive mechanism may drive a second material e.g. the second material (for forming the resilient portion) described supra. The extruding apparatus may comprise a third drive mechanism for driving the (aforementioned) third material. The first/second/third drive mechanism may comprise a hydraulic drive mechanism.

The first drive mechanism, (the third drive mechanism,) the second drive mechanism and the die system may be configured to cooperatively form an extruded product by coextrusion. Similarly, the first and second drive mechanisms may be configured to cooperatively form an extruded product by coextrusion, using the die system, of the first material driven by the first drive mechanism and the second material driven by the second drive mechanism. The extruded product may be a flooring component as described in the present disclosure, i.e. a flooring component having features/structures as described in the present disclosure.

The first and second drive mechanisms may drive the first and second materials through a single, common die (constituting the die system) to form the extruded product. For example, the first and second drive mechanisms may drive the first and second materials through a common die, the first and second drive mechanisms delivering the first and second materials to (respective locations adjacent to) the common die such that the second material forms the resilient portion of the (extruded) flooring component and the first material forms the remainder of the flooring component. Similarly, the first drive mechanism may drive the first material through a first die of the die system, and the second drive mechanism may drive the second material through a second die of the die system, the output of the first material from the first die being merged with the output of the second material from the second die, e.g. by a press or roll mill, to form the extruded product. Similarly, the first drive mechanism may drive the first material through a first die of the die system together with the second material driven through the (first and) second die by the second drive mechanism, the (first and second) material output from the first die constituting the extruded product. The first die/common die may be shaped to form a flooring component (body) as described in the present disclosure. The second die may be shaped to form a resilient portion as described in the present disclosure.

A method of manufacturing a flooring component in accordance with the present disclosure may comprise driving a material through a die to produce an extruded product having a cross-section of a flooring component (body)/ resilient portion as described in the present disclosure, i.e. a flooring component (body)/resilient portion having features/ structures as described in the present disclosure, and sectioning off lengths of the extruded product. The sectioning may comprise sectioning the extruded product into individual flooring components having a length/width as described in the present disclosure.

A method of manufacturing a flooring component in accordance with the present disclosure may comprise driving a first material and a second material into a die system to form an extruded product by coextrusion (of the first and second material). The extruded product may be a flooring component as described in the present disclosure, i.e. a flooring component having features/structures as described in the present disclosure. The method may comprise driving the third material into the die system.

The method may comprise driving the first and second materials through a single, common die (constituting the die system) to form the extruded product. For example, the method may comprise driving the first and second materials through a common die, the driven first and second materials being delivered to (respective locations adjacent to) the common die such that the second material forms the resilient portion of the (extruded) flooring component and the first material forms the remainder of the flooring component. Similarly, the method may comprise driving the first material through a first die of the die system, driving the second material through a second die of the die system, and merging the output of the first material from the first die with the output of the second material from the second die, e.g. by means of a press or by roll milling, to form the extruded product. Similarly, the method may comprise driving the first material through a first die of the die system and driving the second material through a second die of the die system, the first material being driven through the first die together with the second material that has been driven through the second die (i.e. together with the second material output/ formed by the second die), the (first and second) material output from the first die constituting the extruded product. The first die/common die may be shaped to form a flooring component (body) as described in the present disclosure. The second die may be shaped to form a resilient portion as described in the present disclosure.

The die of the extruding apparatus/(extruding) method may have a shape that forms an extruded product having a first engagement structure at a first edge and a second engagement structure at a second, diagonally opposite edge, an extruded product having a first overlap portion and a second overlap portion, an extruded product having the cross-section of a flooring component body comprising a first recessed portion and a second recessed portion, or an extruded product comprising a main body portion, a first extending portion and a second extending portion.

Having regard for the detail of the description of the flooring component (body)/resilient portion elsewhere in the present disclosure, the shape of the aforementioned dies will not be described in detail. The person skilled in the art can readily derive a shape of the respective die from the detailed description of the flooring component (body)/resilient portion. In particular, the respective die may have a shape inverse to a cross-section of the flooring component (body)/resilient portion notwithstanding tolerances known in the field of extrusion.

The method of manufacturing a flooring component in accordance with the present disclosure may comprise assembling a pliable element/resilient portion, e.g. a pliable element/resilient portion as described supra, into a molded/extruded product, e.g. a molded/extruded product as described supra, to produce an assembly of the molded/extruded product and the pliable element/resilient portion. The molded/extruded product may constitute a flooring component (body). For example, the method may comprise assembling a pliable element, e.g. a pliable element constituting a resilient portion, into a flooring component body to form the flooring component. The pliable element/resilient portion may be a distinctly/separately manufactured element. The method may comprise assembling the pliable element/resilient portion into a hollow/groove of the extruded product, e.g. into a hollow/groove of a flooring component body. Similarly, method may comprise assembling the pliable element/resilient portion into (a hollow/groove of) a first/second extending portion of a flooring component.

The assembling may comprise exerting a force onto the pliable element/resilient portion that causes the pliable element/resilient portion to (temporarily/elastically) deform such that the pliable element/resilient portion enters into the hollow/groove. Deformation of the pliable element/resilient portion may cease once the pliable element/resilient portion is positioned within the hollow/groove, thus effecting engagement of the pliable element/resilient portion with the hollow/groove. For example, the hollow/groove may be shaped to provide space that allows the pliable element/resilient portion to (elastically) return to a previous/non-deformed/unbiased shape once the pliable element/resilient portion is positioned within the hollow/groove.

The method may comprise sectioning at least one of the pliable element/resilient portion and the molded/extruded product before and/or after the assembling. The method may comprise drilling into the extruded product at a location of the third material, e.g. from a first major surface of the extruded product to a passage within the extruded product.

A flooring component manufacturing system (for manufacturing a flooring component in accordance with the present disclosure) may comprise any of an injection molding apparatus, a molding apparatus and an extruding apparatus, e.g. for producing a molded/extruded product as described above. The molded/extruded product may constitute a flooring component (body).

The flooring component manufacturing system may comprise an assembly apparatus, e.g. an assembly apparatus for assembling a pliable element/resilient portion, e.g. a pliable element/resilient portion as described supra, into a molded/extruded product, e.g. a molded/extruded product as described supra, to produce an assembly of the molded/extruded product and the pliable element/resilient portion. The assembly apparatus may assemble the pliable element/resilient portion into a hollow/groove of the molded/extruded product, e.g. by exerting a force onto the pliable element/resilient portion that causes the pliable element/resilient portion to (temporarily/elastically) deform such that the pliable element/resilient portion enters into the hollow/groove. Deformation of the pliable element/resilient portion may cease (i.e. the pliable element/resilient portion may (elastically) return to a previous/non-deformed shape) once the pliable element/resilient portion is positioned within the hollow/groove, thus effecting engagement of the pliable element/resilient portion with the hollow/groove.

The assembly may constitute a flooring component. The assembly apparatus may receive the molded/extruded product (from an injection molding apparatus/molding apparatus/extruding apparatus of the system), e.g. by means of a transport mechanism of the system.

The pliable element/resilient portion may be manufactured (by molding/extrusion) by an injection molding apparatus/molding apparatus/extruding apparatus of the system. The system may comprise a transport mechanism that transports the pliable element/resilient portion from the injection molding apparatus/molding apparatus/extruding apparatus to the assembly apparatus.

The system may comprise a sectioning apparatus, e.g. for sectioning at least one of the pliable element/resilient portion and the molded/extruded product. The section apparatus may be arranged in the system to effect the sectioning prior and/or subsequent to assembly by the assembly apparatus.

General Description of Installing Flooring

A plurality of flooring components in accordance with the present disclosure may be assembled to flooring. The individual flooring components may fit together to form essentially continuous flooring on a surface, e.g. on a floor or on the ground. For example, the plurality of flooring components may be arranged to form (protective) flooring on the floor of a cargo container.

A method of installing flooring in accordance with the present disclosure may comprise arranging a first plurality of flooring components in accordance with the present disclosure on a surface, e.g. on a floor, such that such that one of the first major surface and the second major surface of each of the flooring components contacts the surface and such that, for each of a second plurality of the flooring components, a female structure (of the respective flooring component) matingly engages a male structure of an adjacent one of the first plurality of flooring components and a male structure (of the respective flooring component) matingly engages a female structure of an adjacent one of said first plurality of flooring components. The second plurality of flooring components may comprise all of the first plurality of flooring components except a plurality of flooring components arranged at opposite (widthwise, e.g. as defined supra) edges of the arrangement of flooring components. The method may comprise pivoting any of the first plurality of flooring components, e.g. to effect engagement of a male/female structure of the respective flooring component with a female/male structure (of opposite sex) of an adjacent flooring component. The pivoting may comprise pivoting the respective flooring component around an axis that extends in a lengthwise (e.g. as defined supra) direction of the respective flooring component. The pivoting may comprise pivoting the respective flooring component in any manner described above, for example around an axis (that extends in a substantially lengthwise direction) proximate to the first extending portion of the respective flooring component, e.g. around an axis intersecting/collinear with a (corner) edge of the flooring component (most) distal/diagonally opposite from second extending portion.

The method may comprise pivoting any of the first plurality of flooring components, e.g. to effect engagement of a male/female structure of the respective flooring component with a female/male structure (of opposite sex) of an adjacent flooring component. The pivoting may comprise pivoting the respective flooring component around an axis that extends in a lengthwise (e.g. as defined supra) direction of the respective flooring component. The pivoting may comprise pivoting the respective flooring component in any manner described above, for example around an axis (that extends in a substantially lengthwise direction) proximate to the first extending portion of the respective flooring component, e.g. around an axis intersecting/collinear with a (corner) edge of the flooring component (most) distal/diagonally opposite from second extending portion.

Similarly, a method of installing flooring in accordance with the present disclosure may comprise arranging a first plurality of flooring components in accordance with the present disclosure on a surface, e.g. on a floor, such that one of the first major surface and the second major surface of each of the flooring components contacts the surface and such that, for each of a second plurality of the flooring components, the first overlap/protrusion portion engages the second overlap/protrusion portion of a (first) adjacent one of the first plurality of flooring components in counterpart engagement (e.g. as described above with regard to the structure of the flooring component or with regard to the method of installing flooring) and the second overlap/protrusion portion matingly engages the first overlap/protrusion portion of a (second) adjacent one of the first plurality of flooring components in counterpart engagement (e.g. as described above with regard to the structure of the flooring component or with regard to the method of installing flooring). The (first and second) adjacent flooring components may be respectively adjacent to opposite (widthwise) ends of the respective flooring component.

The method may comprise pivoting any of the first plurality of flooring components, e.g. to effect engagement of the first overlap/protrusion portion of the respective flooring component with a second overlap/protrusion portion of an adjacent flooring component. The pivoting may comprise pivoting the respective flooring component around an axis that extends in a lengthwise (e.g. as defined supra) direction of the respective flooring component. The pivoting may comprise pivoting the respective flooring component in any manner described above, for example around an axis (that extends in a substantially lengthwise direction) proximate to the second overlap/protrusion portion of the respective flooring component, e.g. around an axis intersecting/collinear with a (corner) edge of the flooring component (most) distal/diagonally opposite from first overlap/protrusion portion.

Similarly, a method of installing flooring in accordance with the present disclosure may comprise arranging a first plurality of flooring components in accordance with the present disclosure on a surface, e.g. on a floor, such that one of the first major surface and the second major surface of each of the flooring components contacts the surface and such that, for each of a second plurality of the flooring components, a portion of the respective flooring component shaped by the first recessed portion of the respective flooring component engages a portion of a (first) adjacent one of the first plurality of flooring components shaped by the second recessed portion of the (first) adjacent flooring component in counterpart engagement (e.g. counterpart engagement as described above with regard to the structure of the flooring component or with regard to the method of installing flooring) and a portion of the respective flooring component shaped by the second recessed portion of the respective flooring component matingly engages a portion of a (second) adjacent one of the first plurality of flooring components shaped by the first recessed portion of the (second) adjacent flooring component in counterpart engagement (e.g. counterpart engagement as described above with regard to the structure of the flooring component or with regard to the method of installing flooring). The (first and second) adjacent flooring components may be respectively adjacent to opposite (widthwise) ends of the respective flooring component.

The method may comprise pivoting any of the first plurality of flooring components, e.g. to effect engagement of a portion of the respective flooring component with the portion of an adjacent one of the first plurality of flooring components shaped by the second recessed portion of the adjacent flooring component. The pivoting may comprise pivoting the respective flooring component around an axis that extends in a lengthwise (e.g. as defined supra) direction of the respective flooring component. The pivoting may comprise pivoting the respective flooring component in any manner described above, for example around an axis (that extends in a substantially lengthwise direction) proximate to the second recessed portion of the respective flooring component, e.g. around an axis intersecting/collinear with a (corner) edge of the flooring component (most) distal/diagonally opposite from first recessed portion.

The installing (in accordance with any of the aforementioned methods) may be effected such that any row (in a lengthwise direction) of flooring components in the arrangement of flooring components may be offset (in a lengthwise direction) by half a length (of a flooring component) relative to the flooring components of an adjacent row. For example, a row of flooring components may consist of a plurality of flooring components of equal length, an adjacent row consisting of a plurality of flooring components of said length, albeit with a flooring component of one half said length or one and a half times said length at each end of the (adjacent) row. Each of the plurality of flooring components may be arranged such that the flooring components of alternate rows are offset (in a lengthwise direction) by half a length (of a flooring component) relative to the flooring components of respective adjacent rows.

Any of the aforementioned methods of installing flooring may comprise (temporarily/elastically) deforming (a portion of) the resilient portion of the flooring component during the pivoting, e.g. during engagement of the flooring component to another flooring component. The deforming may be effected by compression of the resilient portion against a counterpart engagement structure of the other flooring component, e.g. as a result of the pivoting. Similarly, e.g. to effect (snapping) engagement of the flooring component to the other flooring component, any of the methods may comprise positioning the resilient portion in a space formed by the counterpart engagement structure, e.g. a space having a size and/or shape that allows the resilient portion to (elastically) return to a previous/non-deformed/unbiased shape. For example, the pivoting may comprise pivoting the flooring component such that the resilient portion moves into such a space formed by the counterpart engagement structure.

General Description of Repairing Flooring

The present disclosure relates, inter alia, to a method of repairing flooring. The flooring (to be repaired) may comprise a plurality of flooring components arranged as described above. For example, the flooring may comprise a plurality of flooring components arranged to form a (protective) flooring on the floor of a cargo container. Similarly, the flooring may comprise a first plurality of flooring components in accordance with the present disclosure arranged on a surface, e.g. on a floor, such that such that one of the first major surface and the second major surface of each of the flooring components contacts the surface and such that, for each of a second plurality of the flooring components, a female structure (of the respective flooring component) matingly engages a male structure of an adjacent one of the first plurality of flooring components and a male structure (of the respective flooring component) matingly engages a female structure of an adjacent one of said first plurality of flooring components.

A method of repairing flooring in accordance with the present disclosure may comprise pivoting a (first) flooring component relative to a surface (supporting the flooring), e.g. to a floor or to the ground. The pivoting may be a pivoting as described above, e.g. as described with regard to the structure of the flooring component or with regard to the method of installing flooring. The pivoting may effect disengagement of a (first) male/female structure (of a first sex) of the (first) flooring component from a female/male structure (of a second, opposite sex) of another (third) flooring component. The pivoting may effect disengagement of a (second) male/female structure (of the second, opposite sex) of the (first) flooring component from a male/female structure (of the first sex) of (yet) another (fourth) flooring component.

The method may comprise pivoting a (second) flooring component relative to the surface (supporting the flooring), e.g. to a floor or to the ground. Again, the pivoting may be a pivoting as described above, e.g. as described with regard to the structure of the flooring component or with regard to the method of installing flooring. The pivoting may effect engagement of a (third) male/female structure (of a first sex) of the (second) flooring component from the female/male structure (of a second, opposite sex) of the other (third) flooring component. The pivoting may effect engagement of a (fourth) male/female structure (of the second, opposite sex) of the (second) flooring component from the male/female structure (of the first sex) of the (yet) another (fourth) flooring component.

The (third and fourth) flooring components may be respectively adjacent to opposite (widthwise) ends of the (first/second) flooring component. Similarly, the (first/third) male/female structure and the (second/fourth) male/female structure may be respectively located proximate to opposite (widthwise) ends of the (first/second) flooring component, e.g. within an outermost fifth of a width of the (first/second) flooring component.

Similarly, a method of repairing flooring in accordance with the present disclosure may comprise pivoting a (first) flooring component relative to a surface (supporting the flooring), e.g. to a floor or to the ground. The pivoting may be a pivoting as described above, e.g. as described with regard to the structure of the flooring component or with regard to the method of installing flooring. The pivoting may effect disengagement of a portion of the (first) flooring component shaped by the first recessed portion of the (first) flooring component and a portion of another (third) flooring component shaped by the second recessed portion of the (third) flooring component from counterpart engagement (e.g. counterpart engagement as described above with regard to the structure of the flooring component or with regard to the method of installing flooring). The pivoting may effect disengagement of a portion of the (first) flooring component shaped by the second recessed portion of the (first) flooring component and a portion of (yet) another (fourth) flooring component shaped by the first recessed portion of the (yet) another (fourth) flooring component from counterpart engagement (e.g. counterpart engagement as described above with regard to the structure of the flooring component or with regard to the method of installing flooring).

The method may comprise pivoting a (second) flooring component relative to the surface (supporting the flooring), e.g. to a floor or to the ground. Again, the pivoting may be a pivoting as described above, e.g. as described with regard to the structure of the flooring component or with regard to the method of installing flooring. The pivoting may effect engagement of a portion of the (second) flooring component shaped by the first recessed portion of the (second) flooring component and a portion of the other (third) flooring component shaped by the second recessed portion of the (third) flooring component from counterpart engagement (e.g. counterpart engagement as described above with regard to the structure of the flooring component or with regard to the method of installing flooring). The pivoting may effect engagement of a portion of the (second) flooring component shaped by the second recessed portion of the (second) flooring component and a portion of the (yet) another (fourth) flooring component shaped by first recessed portion of the (yet) another (fourth) flooring component from counterpart engagement (e.g. counterpart engagement as described above with regard to the structure of the flooring component or with regard to the method of installing flooring).

Similarly, a method of repairing flooring in accordance with the present disclosure may comprise pivoting a (first) flooring component relative to a surface (supporting the flooring), e.g. to a floor or to the ground. The pivoting may be a pivoting as described above, e.g. as described with regard to the structure of the flooring component or with regard to the method of installing flooring. The pivoting may effect disengagement of the first overlap/protrusion portion of the (first) flooring component and the second overlap/protrusion portion of a (third) flooring component from counterpart engagement (e.g. counterpart engagement as described above with regard to the structure of the flooring component or with regard to the method of installing flooring). The pivoting may effect disengagement of the second overlap/protrusion portion of the (first) flooring component and the first overlap/protrusion portion of the (yet) another (fourth) flooring component from counterpart engagement (e.g. counterpart engagement as described above with regard to the structure of the flooring component or with regard to the method of installing flooring).

The method may comprise pivoting a (second) flooring component relative to the surface (supporting the flooring), e.g. to a floor or to the ground. Again, the pivoting may be a pivoting as described above, e.g. as described with regard to the structure of the flooring component or with regard to the method of installing flooring. The pivoting may effect engagement of the first overlap/protrusion portion of the (second) flooring component and the second overlap/protrusion portion of the (third) flooring component from counterpart engagement (e.g. counterpart engagement as described above with regard to the structure of the flooring component or with regard to the method of installing flooring). The pivoting may effect engagement of the second overlap/protrusion portion of the (second) flooring component and the first overlap/protrusion portion of the (yet) another (fourth) flooring component from counterpart engagement (e.g. counterpart engagement as described above with regard to the structure of the flooring component or with regard to the method of installing flooring).

Any of said first, second, third and flooring components (of the aforementioned methods of repairing flooring) may be a flooring component in accordance with the present disclosure.

Any of the aforementioned methods of repairing flooring may comprise (temporarily/elastically) deforming (a portion of) the resilient portion of a flooring component during the pivoting, e.g. during engagement and/or disengagement of the (respective) flooring component to another flooring component. The deforming may be effected by compression of the resilient portion against a counterpart engagement structure of the other flooring component, e.g. as a result of the pivoting. Similarly, e.g. to effect (snapping) engagement of the flooring component to the other flooring component, any of the methods may comprise positioning the resilient portion in a space formed by the counterpart engagement structure, e.g. a space having a size and/or shape that allows the resilient portion to (elastically) return to a previous/non-deformed/unbiased shape. For example, the pivoting may comprise pivoting the flooring component such that the resilient portion moves into such a space formed by the counterpart engagement structure.

Any of the aforementioned methods of repairing flooring may comprise prying the (first) flooring component to initiate disengagement of at least one engagement structure of the (first) flooring component from at least one (counterpart) engagement structure of at least one other flooring component. The prying may be effected by means of a prying tool positioned in the (aforementioned) gap. Any of the methods may comprise inserting a prying tool into the gap.

Any of the aforementioned methods of repairing flooring may be limited to replacing those flooring components of the flooring of a cargo container that constitute tracks for a fork lift. For example, (inspection and) repair of the flooring of a cargo container may be carried out intermittently, e.g. 3-4 times per year, at least one of those instances of repair being limited to those (worn out) flooring components that constitute tracks for a fork lift. In this respect, it is noted that a cargo container is typically loaded/unloaded either by a (wide) fork lift that travels along a single path located (substantially) along a central, lengthwise axis of the container or by a (narrow) fork lift that (alternately) travels along either of two paths, each located (substantially) along a central, lengthwise axis of a respective lengthwise half of the container. The flooring components located within the aforementioned path (if often loaded/unloaded by a three-wheeled forklift) or at half a forklift axle length to either side of the respective lengthwise axis (if often loaded/unloaded by a four-wheeled forklift) may constitute the forklift tracks.

The Illustrated Embodiments

The various embodiments of the present disclosure having been described above in general terms, the embodiments shown in the Figures will now be elucidated.

FIG. 1 shows a schematic (widthwise) cross-section through an embodiment of a flooring component 100 in accordance with the present disclosure, e.g. as described in the first general description above.

In the illustrated embodiment, flooring component 100 has the form of a tile or pallet having a first engagement structure 120 at a first edge 103 of flooring component 100 and a second engagement structure 130 at a second, diagonally opposite edge 104 of flooring component 100. Flooring component 100 comprises a first major surface 101 and a second major surface 102 on opposite faces of flooring component 100, first major surface 101 and second major surface 102 defining a thickness d1 of flooring component 100. First engagement structure 120 comprises a female structure 122 and second engagement structure 130 comprises a male structure 133 that is a counterpart of female structure 122. In particular, first engagement structure 120 is structured and arranged to engage second engagement structure 130 of another flooring component 100 when flooring component 100 and the other flooring component 100 are arranged such that a minor face 105 at first edge 103 of flooring component 100 is adjacent to/abuts a minor face 106 proximate to second edge 104 of the other flooring component 100.

Figure 2:
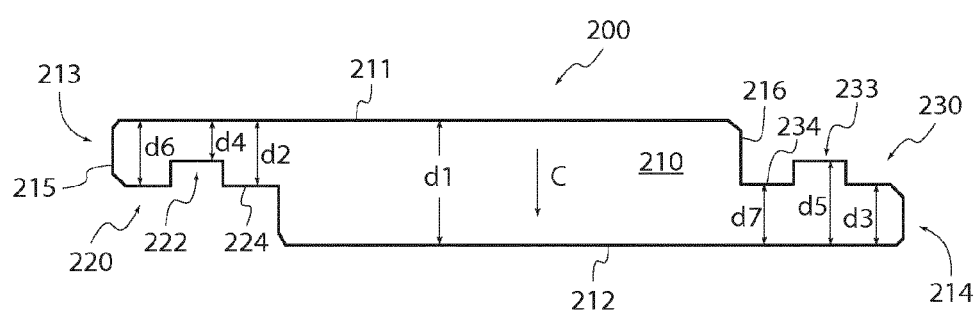
FIG. 2 a schematic (widthwise) cross-section through an embodiment of a flooring component in accordance with the present disclosure.

FIG. 2 shows a schematic (widthwise) cross-section through an embodiment of a flooring component 200 in accordance with the present disclosure, e.g. as described in the second general description above.

In the illustrated embodiment, flooring component 200 comprises a flooring component body 210 having the form of a tile or pallet, flooring component body 210 having a first overlap portion 220 at a first edge 213 of flooring component body 210 and a second overlap portion 230 at a second, (diagonally) opposite edge 214 of flooring component body 210. Flooring component body 210 comprises a first major surface 211 and a second major surface 212 on opposite faces of flooring component body 210, first major surface 211 and second major surface 212 defining a thickness d1 of flooring component body 210. First overlap portion 220 comprises a female structure 222 and second overlap portion 230 comprises a male structure 233 that is a counterpart of female structure 222. In particular, first overlap portion 220 is structured and arranged to engage second overlap portion 230 of another flooring component 200 when flooring component 200 and the other flooring component 200 are arranged such that a minor face 215 of flooring component body 210 at first edge 213 of flooring component body 210 of flooring component 200 is adjacent to/abuts a minor face 216 of flooring component body 210 proximate to second edge 214 of flooring component body 210 of the other flooring component 200.

First overlap portion 220 and second overlap portion 230 are shaped such that the sum of a thickness d2, d4, d6 of first overlap portion 220 as measured, in a thickness direction C of flooring component body 210, from first major surface 211 to a first face 224 of first overlap portion 220 on a side of first overlap portion 220 opposite first major surface 211 and a counterpart thickness d3, d5, d7 of second overlap portion 230 as measured, in a thickness direction C of flooring component body 210, from a second face 234 of second overlap portion 230 on a side of second overlap portion 230 opposite second major surface 212 to second major surface 212 (at a position counterpart to a position at which thickness d2, d4, d6 of first overlap portion 220 is measured if first overlap portion 220 and second overlap portion 230 were in engagement, i.e. thickness d2 being counterpart to thickness d3, thickness d4 being counterpart to thickness d5 and thickness d6 being counterpart to thickness d7) (substantially) equals thickness d1 of flooring component body 210, i.e. are equal, are equal to within 5% (of the larger value) or are equal to within 10% (of the larger value).

Figure 3:
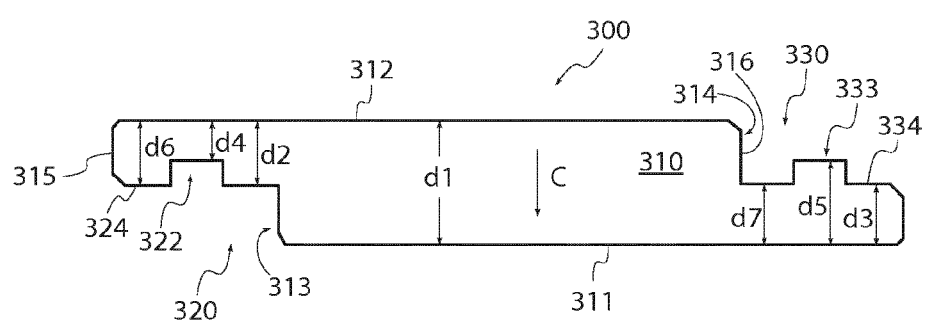
FIG. 3 a schematic (widthwise) cross-section through an embodiment of a flooring component in accordance with the present disclosure.

FIG. 3 shows a schematic (widthwise) cross-section through an embodiment of a flooring component 300 in accordance with the present disclosure, e.g. as described in the third general description above.

In the illustrated embodiment, flooring component 300 comprises a flooring component body 310 having a first major surface 311 and a second major surface 312 on opposite faces of flooring component body 310, first major surface 311 and second major surface 312 defining a thickness d1 of flooring component body 310. Flooring component body 310 comprises a first recessed portion 320 at a first edge 313 of first major surface 311 and a second overlap portion 230 at a second, (diagonally) opposite edge 314 of second major surface 312.

First recessed portion 320 comprises a female structure 322 and second recessed portion 330 comprises a male structure 333 that is a counterpart of female structure 322. In particular, first recessed portion 220 is structured such that a portion of flooring component body 310 shaped by first recessed portion 320 overlaps and engages a portion of another such flooring component 300 shaped by second recessed portion 330 of the other flooring component 300 when flooring component 300 and the other flooring component 300 are arranged such that a minor face 315 of flooring component body 310 proximate to first edge 313 of flooring component body 310 of flooring component 300 is adjacent to/abuts a minor face 316 of flooring component body 310 at second edge 314 of flooring component body 3210 of the other flooring component 300.

First recessed portion 320 defines a first recessed region in first major face 311, and second recessed portion 330 defines a second recessed region in second major face 312. A sum of a thickness d2, d4, d6 of flooring component body 310 at the first recessed region as measured, in a thickness direction C of flooring component body 310, from second major surface 312 to a surface 324 of first recessed portion on a side of first recessed portion opposite second major surface 312 and a counterpart thickness d3, d5, d7 of flooring component body 310 at the second recessed portion as measured, in a thickness direction C of flooring component body 310, from a surface 334 of second recessed portion on a side of second recessed portion opposite first major surface 311 to first major surface 311 (at a position counterpart to a position at which thickness d2, d4, d6 of first recessed portion is measured if first recessed portion and second recessed portion were in engagement, i.e. thickness d2 being counterpart to thickness d3, thickness d4 being counterpart to thickness d5 and thickness d6 being counterpart to thickness d7) (substantially) equals thickness d1 of flooring component body 310, i.e. are equal, are equal to within 5% (of the larger value) or are equal to within 10% (of the larger value).

Figure 4:
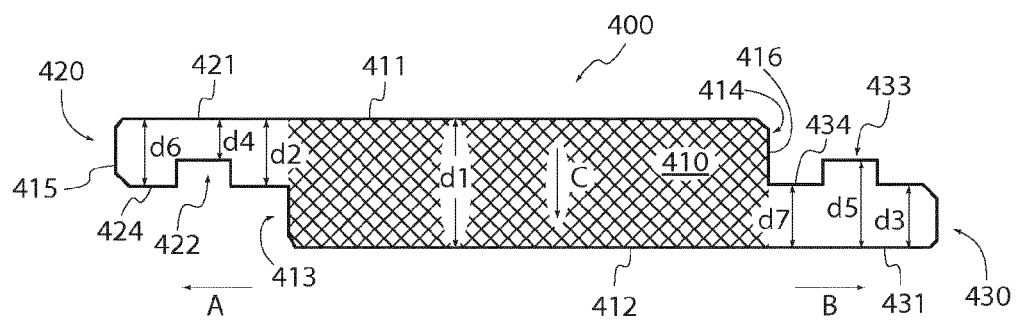
FIG. 4 a schematic (widthwise) cross-section through an embodiment of a flooring component in accordance with the present disclosure.

FIG. 4 shows a schematic (widthwise) cross-section through an embodiment of a flooring component 400 in accordance with the present disclosure, e.g. as described in the fourth general description above.

In the illustrated embodiment, flooring component 400 comprises a main body portion 410 (indicated in the drawing by hatching for the sake of illustration, the hatching not per se signifying that main body portion 410 is composed of a material different from the rest of flooring component 400), a first extending portion 420 and a second extending portion 430. First extending portion 420 extends from main body portion 410 in a first direction A substantially parallel to a first major surface 411 of main body portion 410, first extending portion 420 defining a third surface 421 that is coplanar to first major surface 411. Second extending portion 430 extends from main body portion 410 in a second direction B opposite to first direction A, second extending portion 430 defining a fourth surface 431 that is coplanar to a second major surface 412 of main body portion 410. First major surface 411 and second major surface 412 define a (maximal) thickness d1 of flooring component 400.

First extending portion 420 comprises a female structure 422 and second extending portion 430 comprises a male structure 433 that is a counterpart of female structure 422.

In particular, first extending portion 420 is structured and arranged to engage second extending portion 430 of another flooring component 400 when flooring component 400 and the other flooring component 400 are arranged such that a minor face 415 of flooring component 400 proximate to a first edge 413 of main body portion 410 of flooring component 400 is adjacent to/abuts a minor face 416 main body portion 410 at a second edge 414 of main body portion 410 of the other flooring component 200.

First extending portion 420 and second extending portion 430 are shaped such that the sum of a thickness d2, d4, d6 of first extending portion 220 as measured, in a thickness direction C of flooring component 400, from third surface 421 to a fifth surface 424 of first extending portion 420 on a face of first extending portion 420 opposite third surface 421 and a counterpart thickness d3, d5, d7 of second extending portion 430 as measured, in a thickness direction C of flooring component 400, from a sixth surface 434 of second extending portion 430 on a face of second extending portion 430 opposite fourth surface 431 to fourth surface 431 (at a position counterpart to a position at which thickness d2, d4, d6 of first extending portion 420 is measured if first extending portion 420 and second extending portion 430 were in engagement, i.e. thickness d2 being counterpart to thickness d3, thickness d4 being counterpart to thickness d5 and thickness d6 being counterpart to thickness d7) (substantially) equals thickness d1 of flooring component 400, i.e. are equal, are equal to within 5% (of the larger value) or are equal to within 10% (of the larger value).

Figure 5:
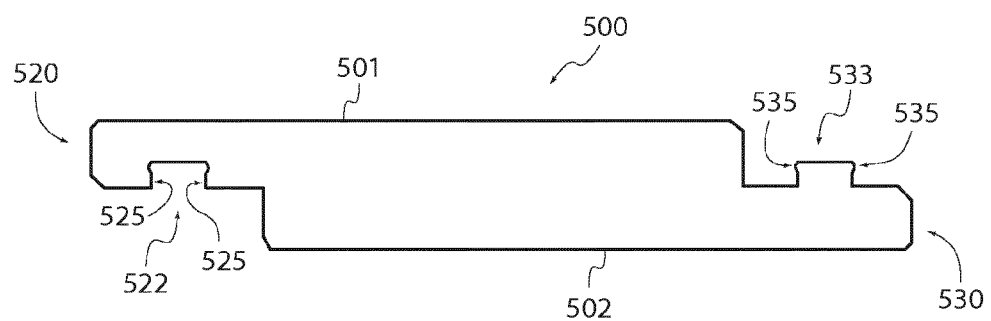
FIG. 5 a schematic (widthwise) cross-section through an embodiment of a flooring component in accordance with the present disclosure comprising a snap lock engagement mechanism.

FIG. 5 shows a schematic (widthwise) cross-section through an embodiment of a flooring component 500 in accordance with the present disclosure comprising a snap lock engagement mechanism. Excepting provision of the snap lock engagement mechanism, flooring component 500 comprises features as shown in any of FIGS. 1 to 4.

In the illustrated embodiment, flooring component 500 comprises a first major surface 501, a second major surface 502, a first engagement structure 520 and a second engagement structure 330. First engagement structure 520 comprises a female structure 522 and second engagement structure 530 comprises a male structure 533 that is a counterpart of female structure 522. Male structure 533 and female structure 522 form counterparts of the snap lock engagement mechanism.

Female structure 522 comprises a resilient structure in the form of bulges 525 that narrow a portion of female structure 522. Similarly, male structure 533 comprises a resilient structure in the form of bulges 535 that widen a portion of male structure 533. Bulges 535 of male structure 533 are resiliently dislocated by bulges 525 of female structure 522 during an engaging/disengaging motion of male structure 533 and female structure 522 relative to one another, which resilient dislocation provides the "snap" of the snap lock engagement mechanism.

Figure 6:
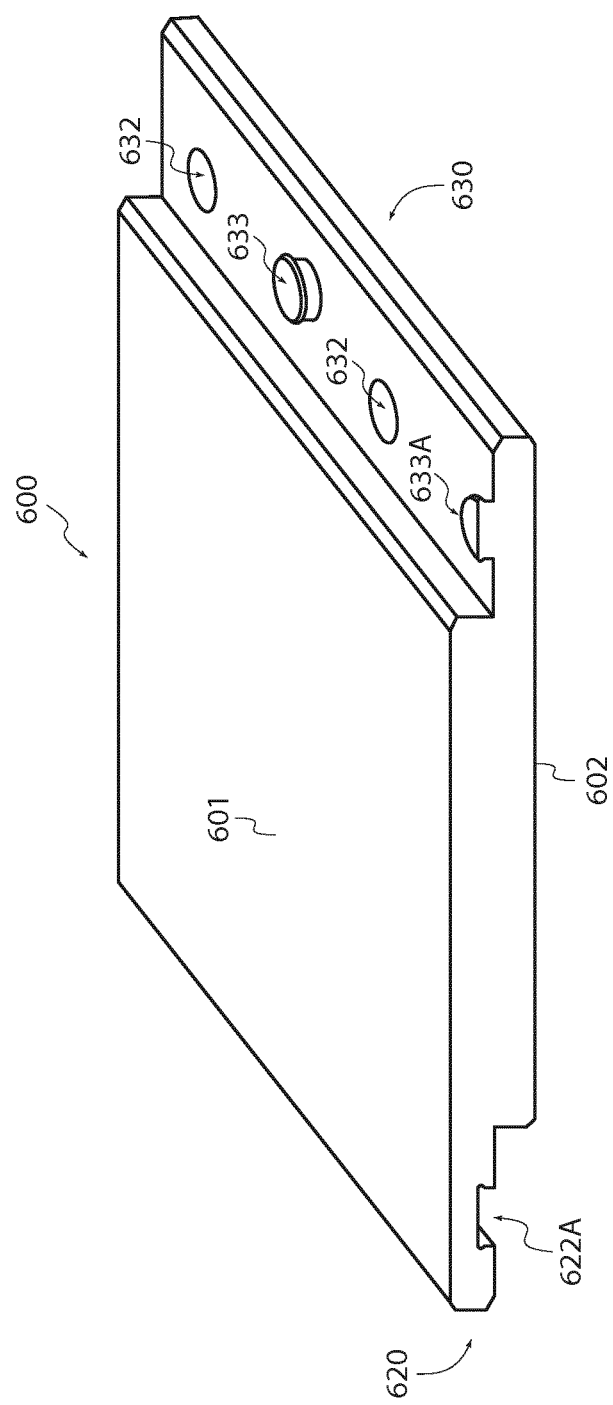
FIG. 6 a schematic, cutaway perspective view of an embodiment of a flooring component in accordance with the present disclosure.

FIG. 6 shows a schematic, cutaway perspective view of an embodiment of a flooring component 600 in accordance with the present disclosure, e.g. as shown in FIG. 5. The view employs cutaway to show a (widthwise) cross-section of flooring component 600.

Figure 11:
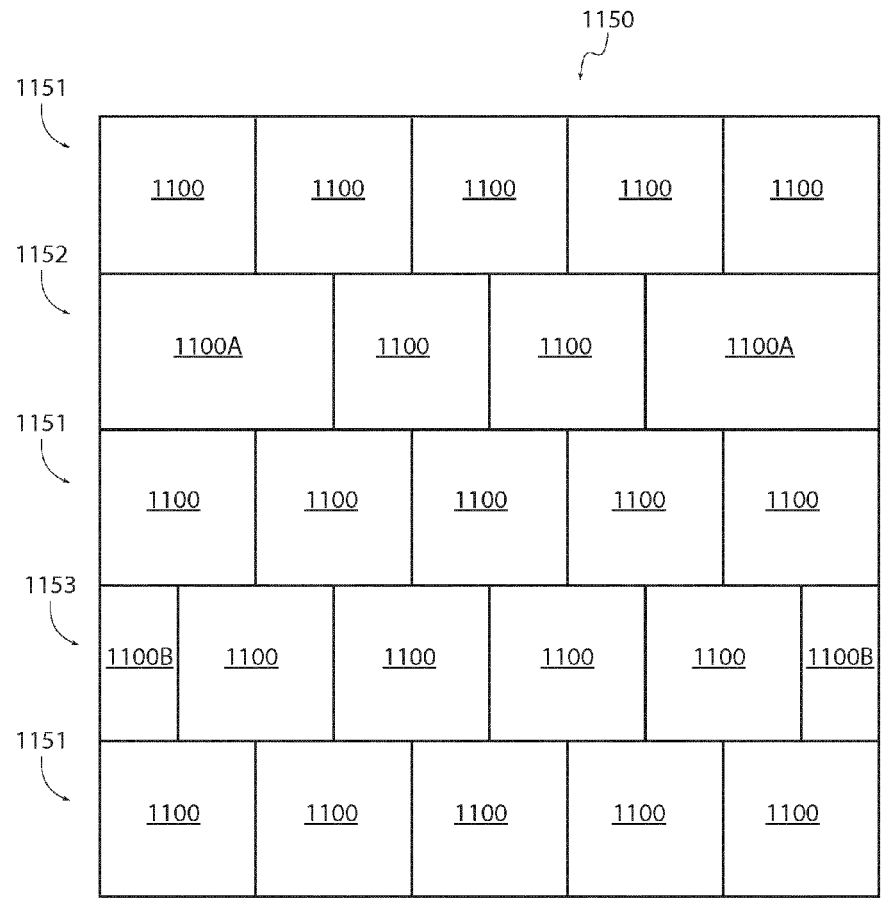
FIG. 11 a schematic depiction of flooring in accordance with the present disclosure.

In the illustrated embodiment, flooring component 600 comprises a first major surface 601, a second major surface 602, a first engagement structure 620 and a second engagement structure 630. First engagement structure 620 comprises a plurality of male and female structures including a female structure 622A shown by the cutaway in cross-section. Second engagement structure 530 comprises a plurality of male structures 633 and female structures 623 that are counterparts of the female/male structures of the first engagement structure, the plurality of male structures 633 of second engagement structure 630 including a male structure 633A shown by the cutaway in cross-section. The illustrated lengthwise alignment of the counterpart male/female structure of first and second engagement structures 620, 630 can aid in aligning a plurality of flooring components 600 in an offset pattern, e.g. as shown in FIG. 11 described infra.

The male and female structures are illustrated as comprising resilient bulges, e.g. as described above with reference to FIG. 5, i.e. as forming counterparts of respective snap lock engagement mechanisms. Such (complex) structures may be manufactured, for example, by molding or extruding a blank having the general shape of flooring component 600, albeit without such bulges, in an early manufacturing process and machining the blank to comprise such bulges in a later manufacturing process, e.g. using a CNC cutting machine or a hot press.

Figure 7:
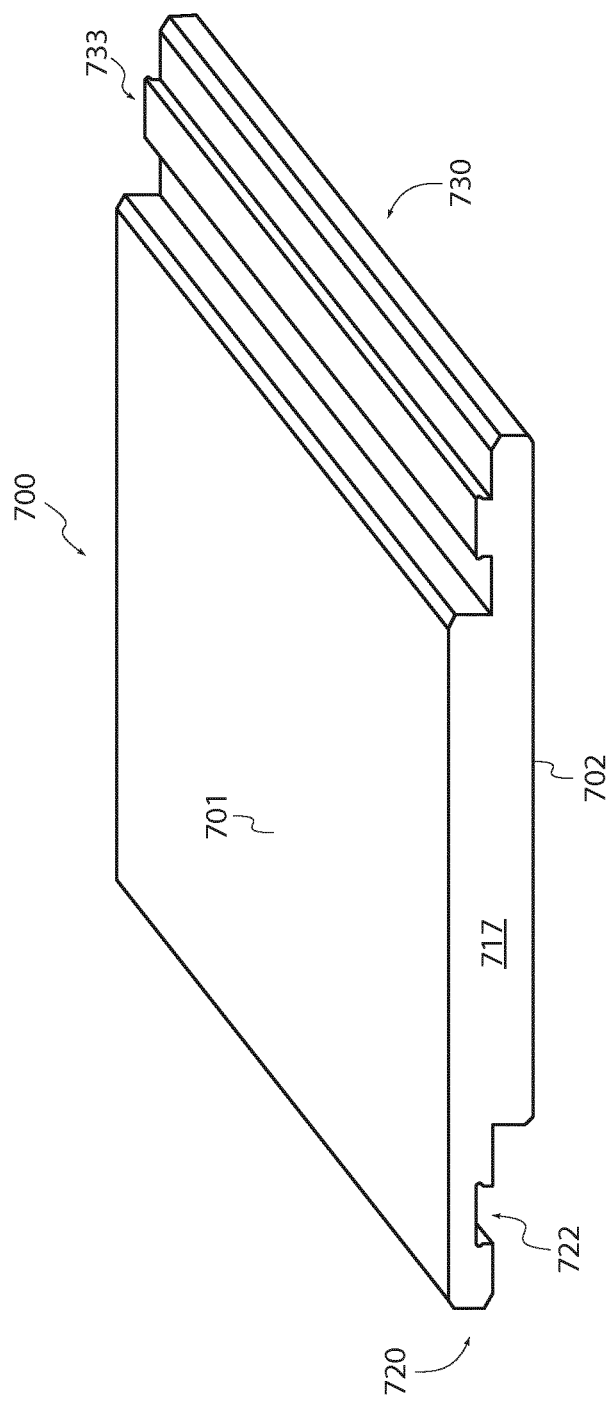
FIG. 7 a schematic, perspective view of an embodiment of a flooring component in accordance with the present disclosure.

FIG. 7 shows a schematic, perspective view of an embodiment of a flooring component 700 in accordance with the present disclosure, e.g. as shown in FIG. 5.

In the illustrated embodiment, flooring component 700 comprises a first major surface 701, a second major surface 702, a planar minor face 717, a first engagement structure 720 and a second engagement structure 730. First engagement structure 720 comprises a female structure 722, and second engagement structure 730 comprises a male structure 733 that is a counterpart of female structure 722, male structure 733 and female structure 722 forming counterparts of a snap lock engagement mechanism. Specifically, male structure 733 and female structure 722 are illustrated as comprising resilient bulges, e.g. as described above with reference to FIG. 5. Planar minor face 717 and an opposite (planar) face of flooring component 700 not visible in the perspective view define a length of flooring component 700.

On account of its constant (widthwise) cross-section, flooring component 700 may be manufactured by extrusion, the extruded material being sectioned, e.g. along planar minor face 717, to define a length of flooring component 700.

Figure 8:
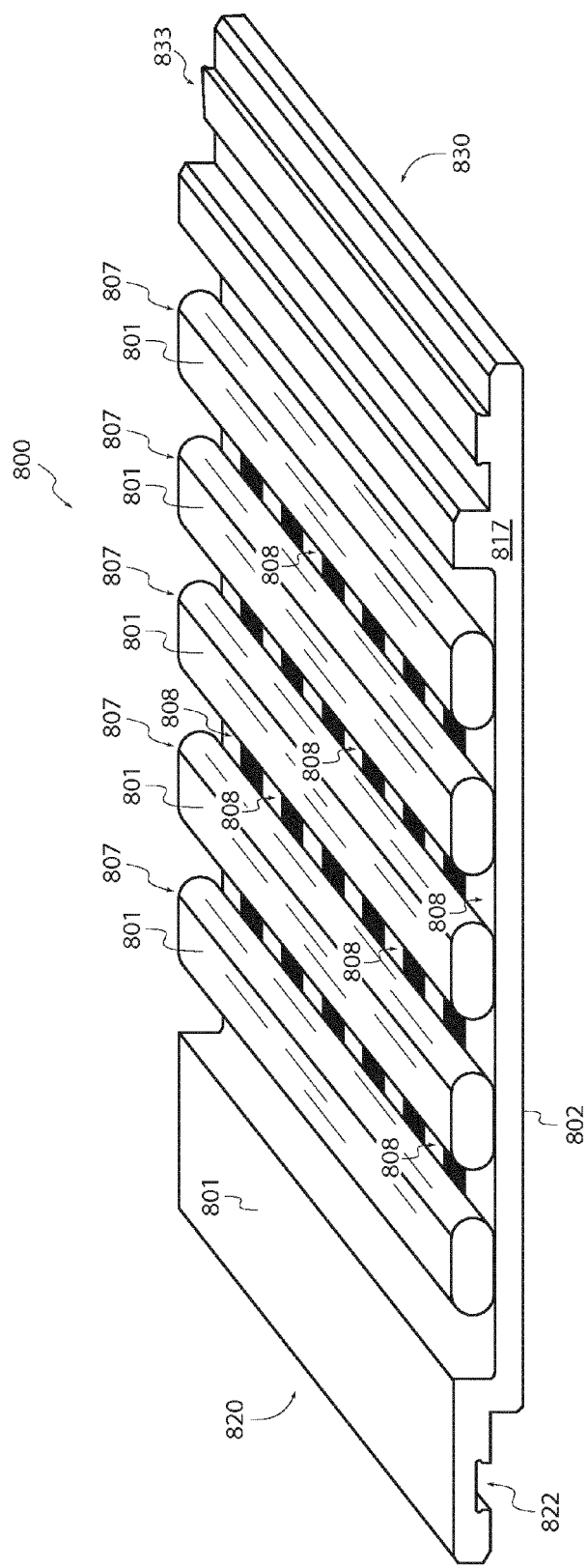
FIG. 8 a schematic, perspective view of an embodiment of a flooring component in accordance with the present disclosure.

FIG. 8 shows a schematic, perspective view of an embodiment of a flooring component 800 in accordance with the present disclosure.

In the illustrated embodiment, flooring component 700 comprises a disjointed first major surface 801 defined, inter alia, by respective surfaces of a plurality of tubular portions 807, a disjointed second major surface 802 defined, inter alia, by respective surfaces of a plurality of tubular portions 808, a planar minor face 817, a first engagement structure 820 and a second engagement structure 830. First engagement structure 820 comprises a female structure 822, and second engagement structure 830 comprises a male structure 833 that is a counterpart of female structure 822, male structure 833 and female structure 822 forming counterparts of a snap lock engagement mechanism. Specifically, male structure 833 and female structure 822 are illustrated as comprising resilient bulges, e.g. as described above with reference to FIG. 5. Planar minor face 817 and an opposite (planar) face of flooring component 800 not visible in the perspective view define a length of flooring component 800.

Flooring component 800 may be manufactured, for example, by molding or extruding a blank having the general shape of tubular portions 808, first engagement structure 820 and second engagement structure 830, either with or without the gaps (depicted by black rhomboids in FIG. 8) between adjacent pairs of tubular portions 808. If the blank is formed without such gaps, the gaps may be formed into the blank prior to the other manufacturing processes described below, e.g. using a stamping/cutting mechanism. In a later manufacturing process, tubular portions 807 may be formed and adjoined to the aforementioned blank, e.g. in a hot process that creates a strong bond between tubular portions 807 and tubular portions 808 comparable in strength to the material of tubular portions 807 and tubular portions 808.

In an alternative embodiment (not shown), flooring component 800 may be manufactured without the aforementioned gaps, thus allowing manufacture of the entire component in a single extrusion process on account of its constant (widthwise) cross-section. Like the embodiment shown in FIG. 8, such an embodiment requires less material and has less weight than a solid embodiment of similar dimensions. However, the alternative embodiment does not allow dirt and liquids to flow through flooring component 800.

Figure 9:
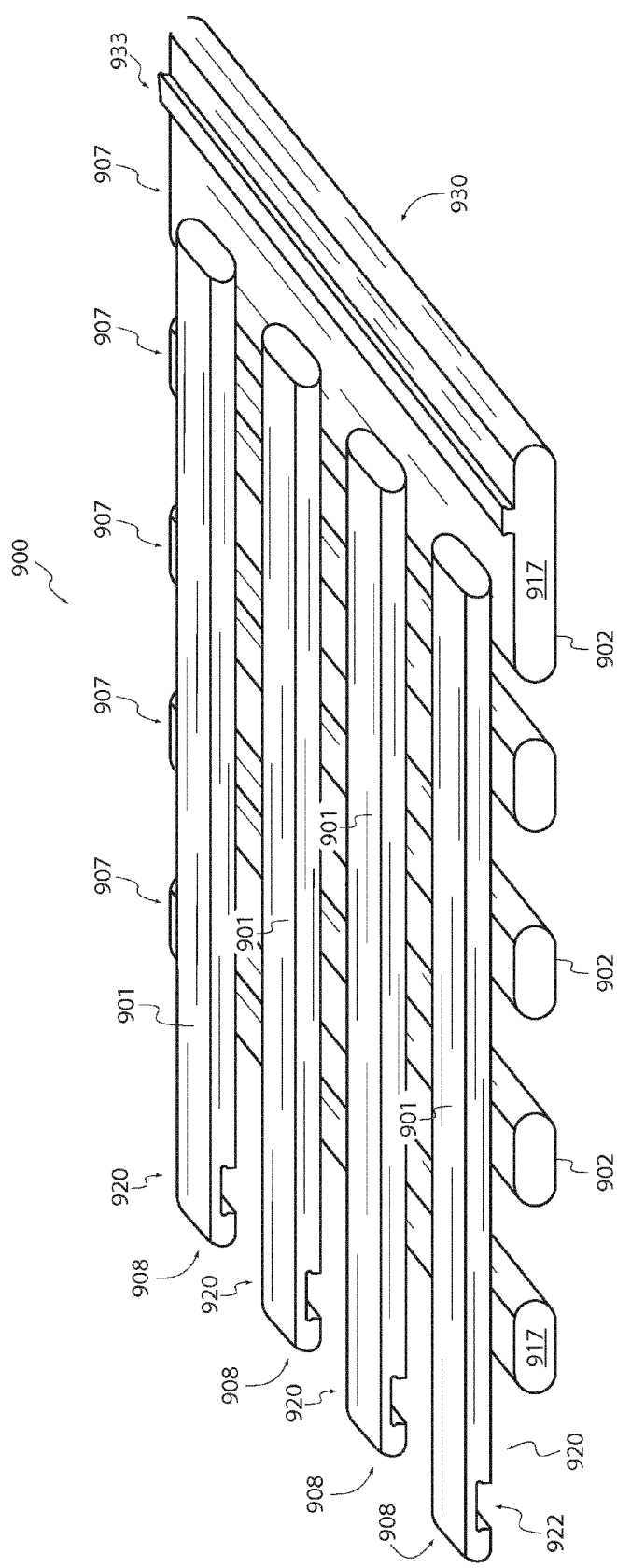
FIG. 9 a schematic, perspective view of an embodiment of a flooring component in accordance with the present disclosure.

FIG. 9 shows a schematic, perspective view of an embodiment of a flooring component 900 in accordance with the present disclosure.

In the illustrated embodiment, flooring component 900 comprises a first plurality of tubular portions 908 and a second plurality of tubular portions 907. Tubular portions 908 define a disjointed first major surface 901 and respective first engagement structures 920. Tubular portions 907 define a disjointed second major surface 902, a second engagement structure 930 and a planar minor face 917.

First engagement structures 920 comprises female structures 922, and second engagement structure 930 comprises a male structure 933 that is a counterpart of female structures 922, male structure 933 and female structures 922 forming counterparts of a snap lock engagement mechanism. Specifically, male structure 933 and female structures 922 are illustrated as comprising resilient bulges, e.g. as described above with reference to FIG. 5. Planar minor face 917 and an opposite (planar) face of flooring component 900 not visible in the perspective view define a length of flooring component 900.

Flooring component 900 may be manufactured by molding. Similarly, flooring component 900 may be manufactured by extruding tubular portions 908 and tubular portions 907, e.g. individually or in parallel, (sectioning the extruded tubular portions 907, 908 to the required lengths) and adjoining tubular portions 908 and tubular portions 907 in the illustrated configuration, e.g. in a hot process that creates a strong bond between tubular portions 907 and tubular portions 908 comparable in strength to the material of tubular portions 907 and tubular portions 908. The manufacturing processing may including machining female structures 922 into tubular portions 908, either before or after adjoining tubular portions 908 and tubular portions 907.

FIG. 10A shows a schematic (widthwise) cross-section through a plurality of flooring components 1000 arranged on a surface 1040 to form flooring in accordance with the present disclosure.

In the illustrated embodiment, a plurality of flooring components 1000 are provided in abutting arrangement on a surface 1040, e.g. on the ground or on the floor of a cargo container, to form flooring, a respective major surface of the flooring components 1000 lying essentially coplanar with surface 1040.

A female structure in an engagement structure of flooring component 1000A is in engagement with a male on an engagement structure of flooring component 1000C, and a male structure on another engagement structure of flooring component 1000A is in engagement with a female in an engagement structure of flooring component 1000B.

FIG. 10B shows a schematic (widthwise) cross-section through a plurality of flooring components 1000 during a process of installing/repairing flooring in accordance with the present disclosure.

The Figure depicts a flooring component 1000A as it is pivoted (relative to a surface 1040) around an axis proximate to an engagement structure of flooring component 1000A that engages an engagement structure of flooring component 1000C. In the Figure, the axis may be perpendicular to the plane of the paper sheet at a lower, right-hand corner of flooring component 1000A.

As exemplified by the Figure, the fundamental design of flooring components 1000 allows a single flooring component 1000A to be removed from/inserted into an abutting arrangement of a plurality of such flooring components 1000 on a surface 1040 without laterally dislocating others of the plurality of flooring components 1000. As shown in the Figure, flooring component 1000C is not dislocated at all by pivoting of flooring component 1000A into/from engagement with flooring component 1000C, and flooring component 1000B is only slightly by pivoting of flooring component 1000A into/from engagement with flooring component 1000B.

FIG. 11 shows a schematic depiction of flooring 1150 in accordance with the present disclosure.

In the illustrated embodiment, flooring 1150 comprises a plurality of abuttingly arranged flooring components 1100. Flooring 1150 comprises a plurality of rows 1151, 1152 and 1153. In rows 1151, each of flooring components 1100 has the same length. Flooring components 1100A located at respective ends of row 1152 having a length one and a half times the length of flooring components 1100 in row 1151, and the remainder of flooring components 1100 in row 1152 have the same length as flooring components 1100 in row 1151. Flooring components 1100B located at respective ends of row 1153 having a length equal to half the length of flooring components 1100 in row 1151, and the remainder of flooring components 1100 in row 1153 have the same length as flooring components 1100 in row 1151. This embodiment exemplifies how flooring 1150 of constant length can be provided in a strong, interlocking arrangement using only two types of flooring components.

Figure 12A:
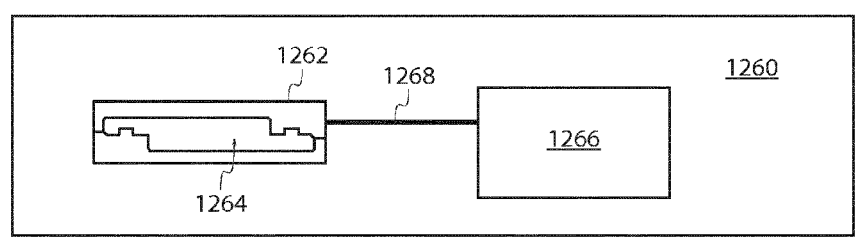
FIGS. 12A and 12B a schematic depiction of an injection molding apparatus and a mold in accordance with the present disclosure.
Figure 12B:
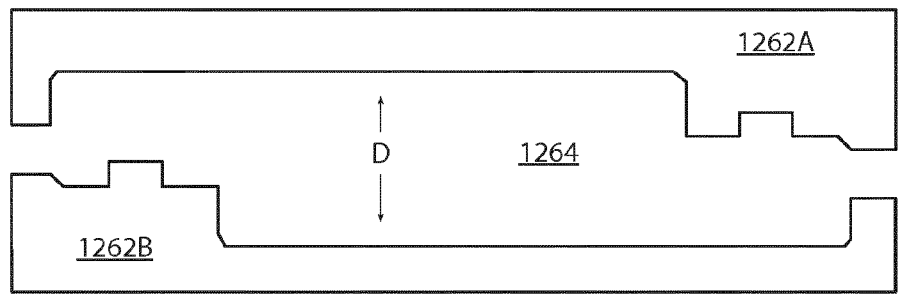

FIGS. 12A and 12B shows a schematic depiction of an injection molding apparatus 1260 and a mold 1262 in accordance with the present disclosure, in particular for manufacturing a flooring component in accordance with the present disclosure.

In the illustrated embodiment, injection molding apparatus 1260 comprises mold 1262, an injection apparatus 1266 and a feed channel 1264, mold 1262 comprising a mold chamber 1264. As schematically depicted in FIG. 12B, mold 1262 may be formed of a first part 1262A and a second part 1262B that are separable/closable e.g. along an axis D, the first and second parts 1262A, 1262B defining mold chamber 1264 when closed in abutting arrangement.

To manufacture a flooring component, a material that is to form the flooring component is melted to liquid, pressurized and injected into mold chamber 1264 by injection apparatus 1266 via feed channel 1268, where it congeals in the shape defined by mold chamber 1264. Mold 1262 is then opened and the (semi-)solidified material is removed/ejected from mold 1262, e.g. by means of an ejection mechanism or by inverting a part of the mold supporting the material after opening and allowing the material to fall out of the mold by gravity.

Figure 13A:
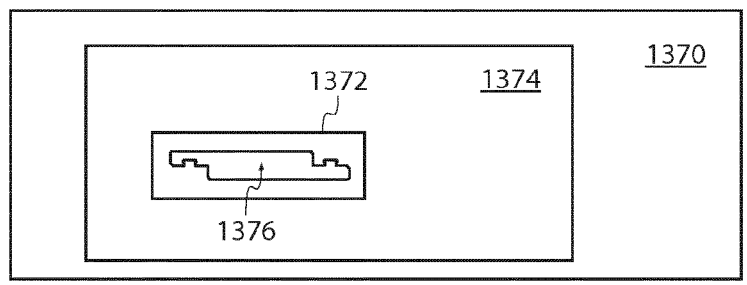
FIGS. 13A and 13B a schematic depiction of an extruding apparatus and a die in accordance with the present disclosure.
Figure 13B:
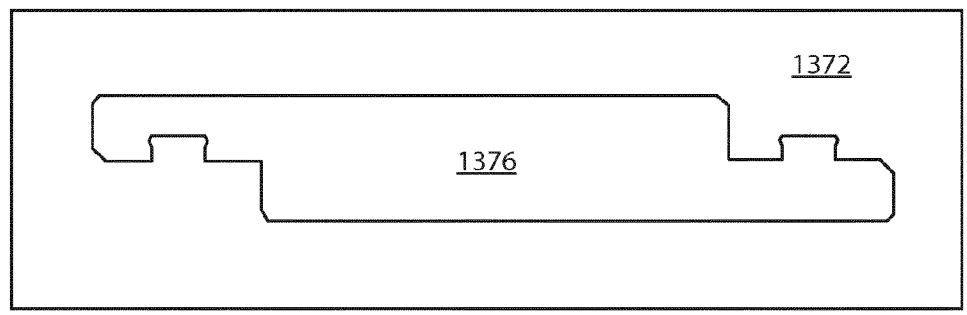

FIGS. 13A and 13B shows a schematic depiction of an extruding apparatus 1370 and a die 1372 in accordance with the present disclosure, in particular for manufacturing a flooring component in accordance with the present disclosure.

In the illustrated embodiment, extruding apparatus 1370 comprises die 1372 and a drive mechanism 1374 that drives a material through an opening 1376 in die 1372, e.g. by means of a screw mechanism. Extruding apparatus 1370 may heat the material to a molten state and drive the material through die 1372 in its molten state. Extruding apparatus 1370 may drive the material through die 1372 at a pressure on the order of tens of MPa.

After being extruded through opening 1376 in die 1372, the material may be (actively) cooled/allowed to (passively) cool before being sectioned into desired lengths.

Figure 14:
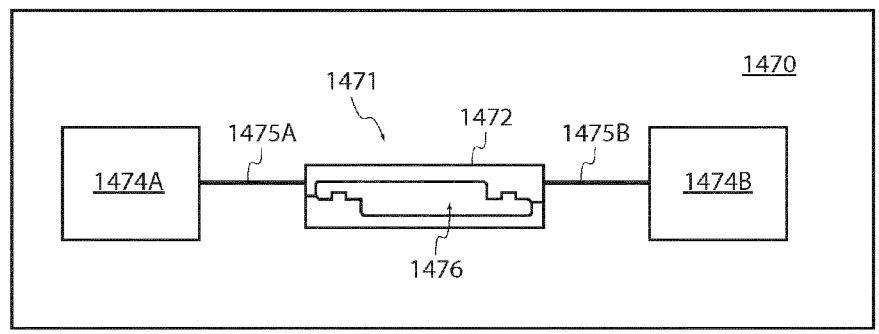
FIG. 14 a schematic depiction of an extruding apparatus in accordance with the present disclosure.

FIG. 14 shows a schematic depiction of an extruding apparatus 1470 in accordance with the present disclosure, e.g. as described above, in particular for manufacturing a flooring component in accordance with the present disclosure.

In the illustrated embodiment, extruding apparatus 1470 comprises die system 1471 comprising at least one die 1472, a first drive mechanism 1474A that drives a first material and a second drive mechanism 1474B that drives a second material, first and second drive mechanisms 1474A, 1374B being configured to drive the first and second materials into die system 1471 under pressure, e.g. by means of a screw mechanism. The first and second materials driven into die system 1471 may exit die system 1471 through an opening 1476 in die 1472. Extruding apparatus 1470 may heat the materials to a molten state and drive the materials through die system 1471 in a molten state, e.g. via conduits 1475A, 1475B. Extruding apparatus 1470 may drive the materials through die system 1471 at a pressure on the order of tens of MPa. The extruded product may be (actively) cooled/allowed to (passively) cool before being sectioned into desired lengths.

Figure 15A:
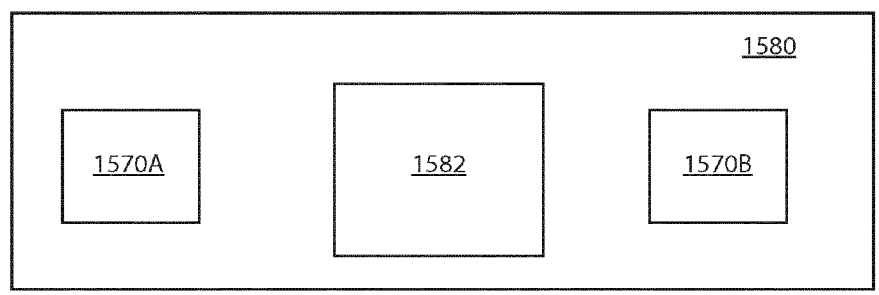
FIG. 15A to 15C a schematic depiction of a flooring component manufacturing system and assembly of extruded products in accordance with the present disclosure.

FIG. 15A shows a schematic depiction of a flooring component manufacturing system 1580, e.g. as described above, in particular for manufacturing a flooring component in accordance with the present disclosure.

In the illustrated embodiment, flooring component manufacturing system 1580 comprises an extruding apparatus 1570A for producing a first extruded product in the form of a flooring component (body), e.g. as described above, an extruding apparatus 1570B for producing a second extruded product in the form of a resilient portion, e.g. as described above, and an assembly apparatus 1582 for assembling the first extruded product and the second extruded product, the assembly of the first extruded product and the second extruded product constituting a flooring component.

Figures 15B, 15C:
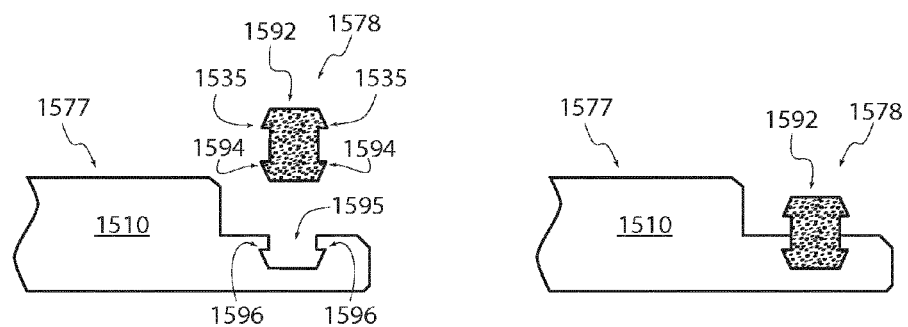

FIGS. 15B and 15C show a schematic depiction of assembly of extruded products in accordance with the present disclosure, e.g. as described above.

As shown in FIG. 15B, a first extruded product 1577 in the form of a flooring component (body) 1510 may be manufactured separately from a second extruded product 1578 in the form of a resilient portion 1592. In the illustrated embodiment, first extruded product 1577 comprises a groove 1595 configured to receive a portion of second extruded product 1578. Furthermore, groove 1595 comprises fastening structures 1596 in the form of ledges that are configured to securingly engage fastening structures 1594 in the form of barbs provided on second extruded product 1598. Second extruded product 1598 moreover comprises bulges 1535 for engaging a counterpart structure of another flooring component. As reflected by the speckling of resilient portion 1592 in the FIGS. 15B and 15C, resilient portion 1592 may be of a different, e.g. more pliable, material than flooring component (body) 1510, thus allowing resilient portion 1592 to be pressed into groove 1595, i.e. to (temporarily/elastically) deform and enter groove 1595.

In the configuration shown in FIG. 15C, second extruded product 1578 has been assembled into groove 1595 of first extruded product 1577, e.g. by pressing second extruded product 1578 into groove 1595, barbs 1594 of resilient portion 1592 securing resilient portion 1592 to flooring component (body) 1510 by virtue of engagement with ledges 1596 of groove 1595.

Figure 16A:
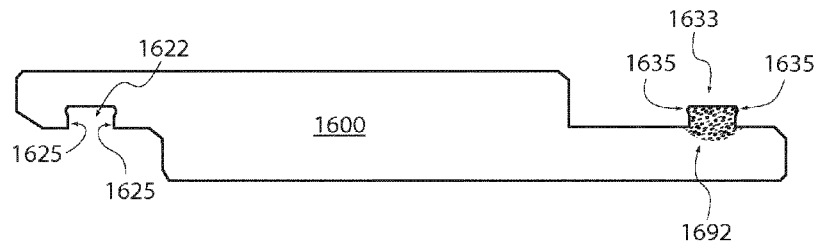
FIG. 16A a schematic (widthwise) cross-section through an embodiment of a flooring component in accordance with the present disclosure.

FIG. 16A shows a schematic (widthwise) cross-section through an embodiment of a flooring component 1600 in accordance with the present disclosure, e.g. as described above.

In the illustrated embodiment, flooring component 1600 comprises an engagement structure in the form of a female structure 1622 and a resilient portion 1692 that constitutes an engagement structure in the form of a male structure 1633. Male structure 1633 is a counterpart of female structure 1622, male structure 1633 and female structure 1622 forming counterparts of a snap lock engagement mechanism. As reflected by the speckling of resilient portion 1692 in the FIGS. 16A and 16B, resilient portion 1692 may be of a different, e.g. more pliable, material than other portions/a remainder of flooring component 1600, e.g. a material that allows resilient portion 1692 to (temporarily/elastically) deform.

Female structure 1622 comprises bulges 1625 that narrow a portion of female structure 1622. Similarly, male structure 1633 comprises bulges 1635 that widen a portion of male structure 1633. Bulges 1635 of male structure 1633 are (temporarily/elastically) deformed by bulges 1625 of female structure 1622 during an engaging/disengaging motion of male structure 1633 and female structure 1622 relative to one another, which (temporary/elastic) deformation provides the "snap" of the snap lock engagement mechanism.

Figure 16B:
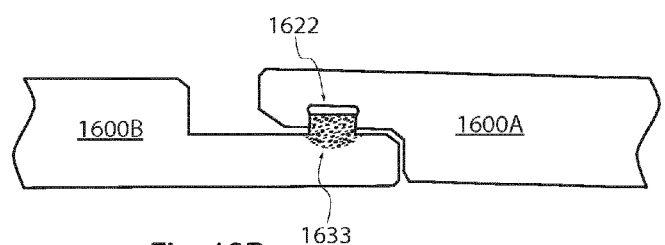
FIG. 16B a schematic depiction of the flooring component of FIG. 16A in partial engagement with another flooring component.

FIG. 16B shows a schematic depiction of flooring component 1600A of FIG. 16A in partial engagement with another (such) flooring component 1600B, e.g. during pivoting of flooring component 1600A relative to flooring component 1600B as described above.

In the illustrated configuration, male structure 1633 and female structure 1622 are in partial engagement, bulges 1635 of male structure 1633 being (temporarily/elastically) deformed by bulges 1625 of female structure 1622 due to the mutual shapes and relative motion of male structure 1633 and female structure 1622.

Figure 17A:
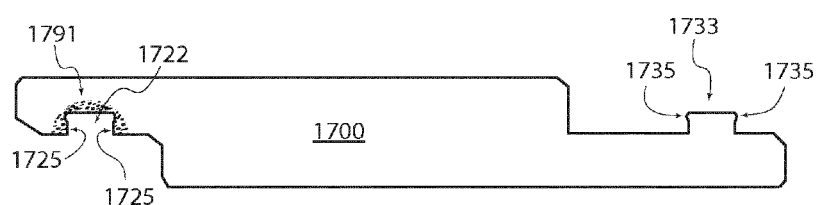
FIG. 17A a schematic (widthwise) cross-section through an embodiment of a flooring component in accordance with the present disclosure.

FIG. 17A shows a schematic (widthwise) cross-section through an embodiment of a flooring component 1700 in accordance with the present disclosure, e.g. as described above.

In the illustrated embodiment, flooring component 1700 comprises an engagement structure in the form of a male structure 1733 and a resilient portion 1791 that constitutes an engagement structure in the form of a female structure 1722. Male structure 1733 is a counterpart of female structure 1722, male structure 1733 and female structure 1722 forming counterparts of a snap lock engagement mechanism. As reflected by the speckling of resilient portion 1791 in the FIGS. 17A and 17B, resilient portion 1791 may be of a different, e.g. more pliable, material than other portions/a remainder of flooring component 1700, e.g. a material that allows resilient portion 1791 to (temporarily/elastically) deform.

Female structure 1722 comprises bulges 1725 that narrow a portion of female structure 1722. Similarly, male structure 1733 comprises bulges 1735 that widen a portion of male structure 1733. Bulges 1725 of female structure 1722 are (temporarily/elastically) deformed by bulges 1735 of male structure 1733 during an engaging/disengaging motion of male structure 1733 and female structure 1722 relative to one another, which (temporary/elastic) deformation provides the "snap" of the snap lock engagement mechanism.

Figure 17B:
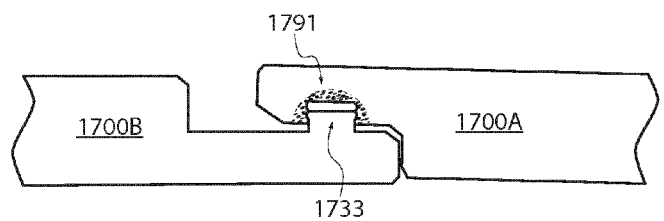
FIG. 17B a schematic depiction of the flooring component of FIG. 17A in partial engagement with another flooring component.

FIG. 17B shows a schematic depiction of flooring component 1700A of FIG. 17A in partial engagement with another (such) flooring component 1700B, e.g. during pivoting of flooring component 1700A relative to flooring component 1700B as described above.

In the illustrated configuration, male structure 1733 and female structure 1722 are in partial engagement, bulges 1725 of female structure 1722 being (temporarily/elastically) deformed by bulges 1735 of male structure 1733 due to the mutual shapes and relative motion of male structure 1733 and female structure 1722.

Figure 18A:
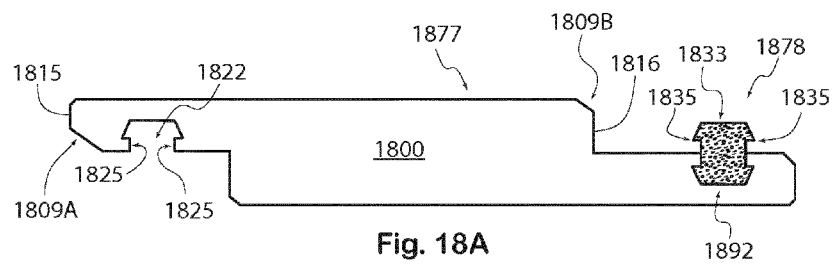
FIG. 18A a schematic (widthwise) cross-section through an embodiment of a flooring component in accordance with the present disclosure.

FIG. 18A shows a schematic (widthwise) cross-section through an embodiment of a flooring component 1800 in accordance with the present disclosure, e.g. as described above.

In the illustrated embodiment, flooring component 1800 comprises an engagement structure in the form of a female structure 1822 and a resilient portion 1892, a (projecting) portion of resilient portion 1892 constituting an engagement structure in the form of a male structure 1833. Similar to the embodiment shown in FIGS. 15B and 15C, flooring component 1800 is assembled from a first extruded product 1877 in the form of a flooring component (body) and a second extruded product 1878 in the form of resilient portion 1892.

Male structure 1833 is a counterpart of female structure 1822, male structure 1833 and female structure 1822 forming counterparts of a snap lock engagement mechanism. As reflected by the speckling of resilient portion 1892 in the FIGS. 18A to 18F, resilient portion 1892 may be of a different, e.g. more pliable, material than other portions/a remainder of flooring component 1800, e.g. a material that allows resilient portion 1892 to (temporarily/elastically) deform.

Female structure 1822 comprises bulges 1825 that narrow a portion of female structure 1822. Similarly, male structure 1833 comprises bulges 1835 that widen a portion of male structure 1833. Bulges 1825 of female structure 1822 are (temporarily/elastically) deformed by bulges 1835 of male structure 1733 during an engaging/disengaging motion of male structure 1833 and female structure 1822 relative to one another, which (temporary/elastic) deformation provides the "snap" of the snap lock engagement mechanism.

Figure 18B:
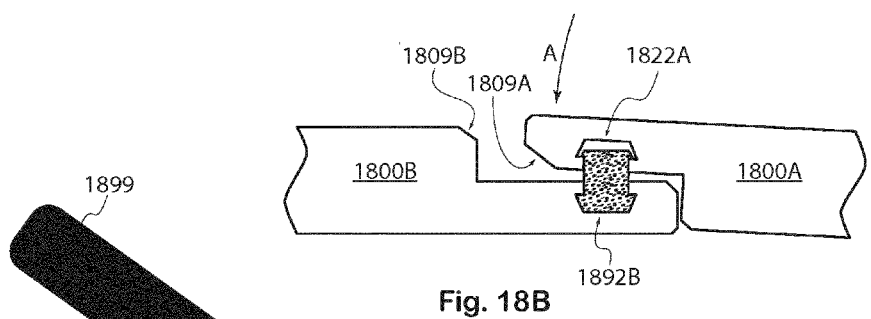
FIGS. 18B to 18D a schematic depiction of engagement and disengagement of the flooring component of FIG. 18A with/from another flooring component.
Figure 18C:
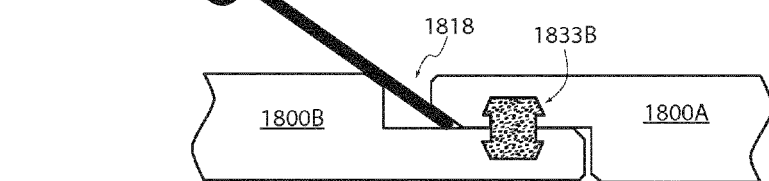

Flooring component 1800 comprises a first bevel 1809A at a corner of an outer-lying minor lateral surface 1815 of flooring component 1800 and a second bevel 1809B at a corner of an inner-lying minor lateral surface 1816 of flooring component 1800. As shown in FIGS. 18B and 18C, the first and second bevels may be at diagonally opposite corners of a groove formed by a gap 1818, and the first bevel may be of a shape and size for receiving a prying tool 1899, e.g. a prying tool for disengaging flooring component 1800A from another such flooring component 1800B, i.e. for prying flooring component 1800A at the first bevel so as to disengage an engagement structure of flooring component 1800A from a counterpart engagement structure of other flooring component 1800B.

Figure 18D:
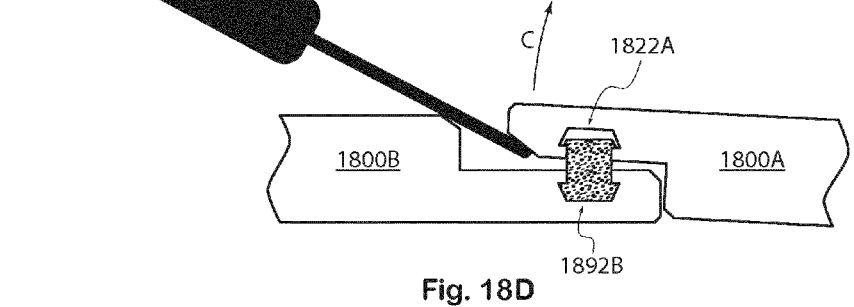

FIGS. 18B to 18D shows a schematic depiction of engagement and disengagement of flooring component 1800A of FIG. 18A with/from other flooring component 1800B, e.g. as described above.

In the configuration illustrated in FIG. 18B, female structure 1822A of flooring component 1800A is in partial engagement with male structure 1833B formed by the (protruding) portion of resilient portion 1892B of other flooring component 1800B as flooring component 1800A is pivoted (as represented by arc-shaped arrow A) relative to other flooring component 1800B, bulges 1835 of male structure 1833B being (temporarily/elastically) deformed by bulges 1825 of female structure 1822A due to the mutual shapes and relative motion of male structure 1833B and female structure 1822A.

In the configuration illustrated in FIG. 18C, female structure 1822A of flooring component 1800A and male structure 1833B of other flooring component 1800B are mutually securely engaged, thus securely engaging flooring component 1800A and other flooring component 1800B. Furthermore, prying tool 1899 is positioned in gap 1818 between respective upper major surfaces of flooring component 1800A and other flooring component 1800B, a tip of prying tool 1899 abutting first bevel 1809A, and a shaft of prying tool 1899 resting on second bevel 1809B.

In the configuration illustrated in FIG. 18D, a (forcible) prying movement of prying tool 1899 (as represented by arc-shaped arrow C) against second bevel 1809B as a leveraging surface has pivoted flooring component 1800A relative to other flooring component 1800B (as represented by arc-shaped arrow C). As a result of the pivoting, bulges 1835 of male structure 1833B have been (temporarily/elastically) deformed by bulges 1825 of female structure 1822A as shown in FIG. 18D due to the mutual shapes and (forced) relative motion of male structure 1833B and female structure 1822A, thus releasing male structure 1833B and female structure 1822A from the mutual secure engagement shown in FIG. 18C to the partial engagement (similar to FIG. 18B) shown in FIG. 18D.

Figure 18E:
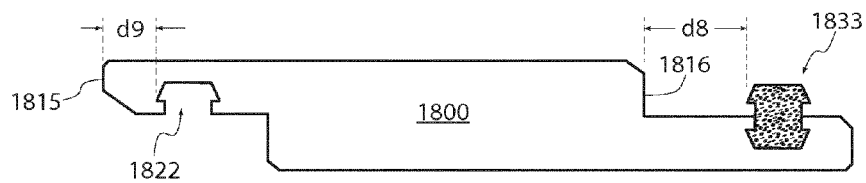
FIGS. 18E and 18F a schematic depiction of further features of the flooring component of FIG. 18A.
Figure 18F:
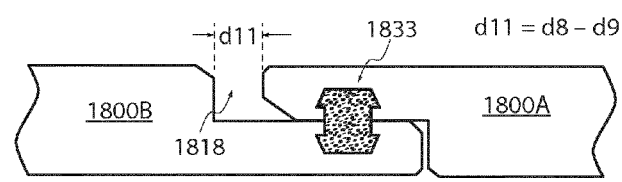

FIGS. 18E and 18F shows a schematic depiction of further features of the flooring component 1800 of FIG. 18A.

As depicted in FIG. 18E, male structure 1833 is distanced by a distance d8 from an inner-lying minor surface of flooring component 1800, and female structure 1822 is distanced by a distance d9 from an outer-lying minor surface of flooring component 1800. As depicted in FIG. 18F, a gap 1818 formed between a(n upper) major surface of flooring component 1800A and a (substantially) coplanar, (upper) major surface of an adjacent, other such flooring component 1800B has a dimension d11 (substantially) equal to a difference obtained by subtracting d9 from d8.

Figure 19A:
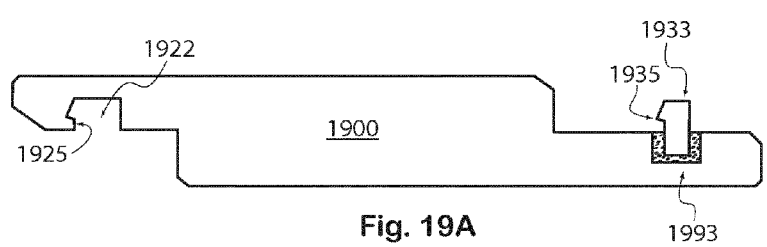
FIG. 19A a schematic (widthwise) cross-section through an embodiment of a flooring component in accordance with the present disclosure.

FIG. 19A shows a schematic (widthwise) cross-section through an embodiment of a flooring component 1900 in accordance with the present disclosure, e.g. as described above.

In the illustrated embodiment, flooring component 1900 comprises an engagement structure in the form of a female structure 1922, an engagement structure in the form of a male structure 1933 and a resilient portion 1993, resilient portion 1993 forming a U-shaped region/trench between (a base of) male structure 1933 and (an adjacent portion of) the flooring component. Female structure 1922 comprises a bulge 1925 that narrows a portion of female structure 1922. Similarly, male structure 1933 comprises a bulge 1935 that widens a portion of male structure 1933. Flooring component 1900, including resilient portion 1993 and male structure 1933, may be integrally formed, e.g. by coextrusion.

Figure 19B:
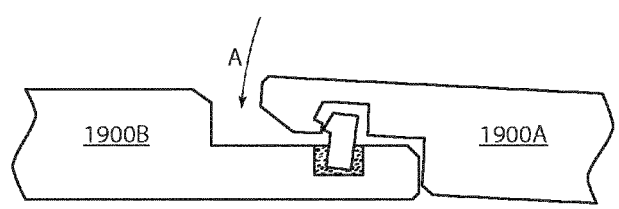
FIGS. 19B and 19C a schematic depiction of engagement of the flooring component of FIG. 19A with another flooring component.
Figure 19C:
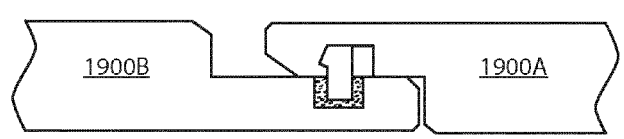

FIGS. 19B and 19C shows a schematic depiction of engagement of the flooring component 1900A of FIG. 19A with another (such) flooring component 1900B.

In the configuration illustrated in FIG. 19B, female structure 1922 of flooring component 1900A is in partial engagement with male structure 1933 of other flooring component 1900B as flooring component 1900A is pivoted (as represented by arc-shaped arrow A) relative to other flooring component 1900B, (temporary/elastic) deformation of resilient portion 1993 allowing bulge 1935 of male structure 1933 to be (temporarily/elastically) dislocated in response to collision with bulge 1925 of female structure 1922 due to the mutual shapes and relative motion of male structure 1933 and female structure 1922.

In the configuration illustrated in FIG. 19C, female structure 1922 of flooring component 1900A and male structure 1933 of other flooring component 1900B are mutually (securely) engaged, thus (securely) engaging flooring component 1900A and other flooring component 1900B. Flooring component 1900A can be released from other flooring component 1900B by prying in a manner analogous to that shown in FIGS. 18C and 18D.

FIGS. 20A and 20B each show a schematic (widthwise) cross-section through respective embodiment of a flooring component 2000 in accordance with the present disclosure, e.g. as described above.

In the illustrated embodiments, flooring component 2000 comprises a first major surface 2001, a second major surface 2002 and a plurality of passages 2019 that extend along a length of flooring component 2000 through an interior thereof. Furthermore, flooring component 2000 comprises a region 2097 formed of a material, e.g. the (aforementioned) third material, that differs from and/or is less abrasive than a material constituting a large percentage of flooring component 2000. Flooring component 2000 moreover comprises a bore 2098 in region 2097, bore 2098 extending from first major surface 2001 through passage 2019 to second major surface 2002.

In both embodiments, second major surface 2002 has a wavy structure. In the embodiment illustrated in FIG. 20A, first major surface 2001 comprises a plurality of indentations, e.g. for the sake of facilitating runoff. In the embodiment illustrated in FIG. 20B, first major surface 2001 comprises a plurality of small ridges, e.g. for the sake of improving grip.

In the present disclosure, the verb "may" is used to designate optionality/noncompulsoriness. In other words, something that "may" can, but need not. In the present disclosure, the verb "comprise" may be understood in the sense of including. Accordingly, the verb "comprise" does not exclude the presence of other elements/actions. In the present disclosure, relational terms such as "first," "second," "top," "bottom" and the like may be used solely to distinguish one entity or action from another entity or action without necessarily requiring or implying any actual such relationship or order between such entities or actions.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

In the present disclosure, many features are described as being optional, e.g. through the use of the verb "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in six different ways, namely with just one of the three possible features, with any two of the three possible features or with all three of the three possible features.

For the sake of avoiding counterintuitive terminology in the description of embodiments not disclosed in the priority application filed on Nov. 13, 2013, the present disclosure often interchanges the terms "length" and "width" vis-à-vis the literal disclosure of said priority application as they relate to the flooring component (body). From the descriptions of the flooring component (body) e.g. at page 9, lines 15-16, page 17, lines 9-10 and page 25, lines 37-38 of the priority application, however, the reader will readily recognize that the terms "length" and "width" are not used in the priority application in a limiting sense that requires the "length" of the flooring component (body) to be larger than the "width" of the flooring component (body). As such, any interchange of these terms in the present application falls within the disclosure of the priority application. Equally, the terms "length" and "width" are not used in the present disclosure in a limiting sense that requires the "length" of the flooring component (body) to be larger than the "width" of the flooring component (body).

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of the invention, even those disclosed solely in combination with other features of the invention, may be combined in any configuration excepting those readily apparent to the person skilled in the art as nonsensical. Likewise, use of the singular and plural is solely for the sake of illustration and is not to be interpreted as limiting. Except where the contrary is explicitly noted, the plural may be replaced by the singular and vice-versa.

The embodiments disclosed hereinabove may be summarized as follows.

Embodiment 1

A flooring component (400) comprising:
a main body portion (410) defining a first major surface (411) and a second major surface (412);
a first extending portion (420) that extends from said main body portion in a first direction (A), said first extending portion defining a third surface (421) coplanar to at least a portion of said first major surface; and
a second extending portion (430) that extends from said main body portion in a second direction (B) opposite said first direction, said second extending portion defining a fourth surface (431) coplanar to at least a portion of said second major surface, wherein
said first extending portion comprises a female structure (422) on a side of said first extending portion opposite said third surface,
said second extending portion comprises a male structure (433) on a side of said second extending portion opposite said fourth surface, and
said female structure is of a shape that matingly engages said male structure.

Embodiment 2

The flooring component of Embodiment 1, wherein:
said female structure is of a shape that snappingly engages said male structure.

Embodiment 3

The flooring component of Embodiment 1 or 2, wherein:
said side of said first extending portion opposite said third surface comprises a fifth surface (424) and said side of said second extending portion opposite said fourth surface comprises a sixth surface (434), said fifth surface having a shape that is a counterpart of a shape of said sixth surface.

Embodiment 4

The flooring component of Embodiment 3, wherein:
a sum of a distance ($d2$, $d4$, $d6$) from said third surface to said fifth surface in a measuring direction (C) perpendicular to said third surface and a counterpart distance ($d3$, $d5$, $d7$) from said sixth surface to said fourth surface in said measuring direction equals a distance ($d1$) from said portion of said first major surface to said portion of said second major surface in said measuring direction.

Embodiment 5

The flooring component of any one of the preceding Embodiments, wherein:
each of said first major surface and said second major surface is substantially planar.

Embodiment 6

A flooring component (300), comprising:
a flooring component body (310) having a first major face (311) and second major face (312) opposite said first major face, wherein
a peripheral outline of said flooring component body has substantially a shape of a rectangular cuboid excepting a first recessed portion (320) along a first edge (313) of said first major face and a second recessed portion (330) along a second edge (314) of said second major face diagonally opposite said first edge,
said first and second recessed portions define counterparts of an engagement mechanism that inhibits lateral motion of said flooring component away from another said flooring component when said first recessed portion is in counterpart engagement with said second recessed portion of said another flooring component,
said first recessed portion is disengageable from said second recessed portion of said another flooring component by a single pivotal motion of said flooring component body around an axis proximate to said second recessed portion.

Embodiment 7

The flooring component of Embodiment 6, wherein:
said first recessed portion is engageable with said second recessed portion of said another flooring component by a single pivotal motion of said flooring component body around an axis proximate to said second recessed portion.

Embodiment 8

The flooring component of any one of the preceding Embodiments, wherein:
said flooring component is manufactured of at least one of a recycled plastic material and a plastic material.

Embodiment 9

An injection molding apparatus (1260) comprising:
a mold (1262) having a mold chamber (1264), and
an injection apparatus (1266) that injects a fluid material into said mold chamber, wherein
said mold chamber is shaped to form a flooring component (100) in accordance with any one of Embodiments 1 to 8.

Embodiment 10

An extruding apparatus (1370) comprising:
a die (1372), and
a drive mechanism (1374) that drives a material through said die, wherein
said die is shaped to form a flooring component (100) in accordance with any one of claims 1 to 8.

Embodiment 11

A method of manufacturing a flooring component (100), comprising:
injecting a fluid plastic material into a mold (1262) having a mold chamber (1264), wherein
said mold chamber is shaped to form a flooring component (100) in accordance with any one of Embodiments 1 to 8.

Embodiment 12

A method of manufacturing a flooring component (100), comprising:
driving a material through a die (1372) to produce an extruded product having a cross-section of a flooring component (100) in accordance with any one of Embodiments 1 to 8, and
sectioning off lengths of said extruded product.

Embodiment 13

A method of installing flooring (1150), the method comprising:
arranging a first plurality of flooring components (1000) in accordance with any one of claims 1 to 5 on a floor (1060) such that one of said first major surface and said second major surface of each of said flooring components contacts said floor and such that, for each of a second plurality of said flooring components, said female structure matingly engages said male structure of an adjacent one of said first plurality of flooring components and said male structure matingly engages said female structure of an adjacent one of said first plurality of flooring components.

Embodiment 14

A method of repairing flooring (1150), the method comprising:
pivoting a first flooring component (1000A) relative to a floor (1060), said pivoting effecting disengagement of said female structure of said first flooring component from said male structure of a third flooring component (1000C) and disengagement of said male structure of said first flooring component from said female structure of a fourth flooring component (1000B); and
pivoting a second flooring component (1000A) relative to said floor, said pivoting effecting engagement of said female structure of said second flooring component to said male structure of said third flooring component and engagement of said male structure of said second flooring component to said female structure of said fourth flooring component, wherein
each of said first, second, third and fourth flooring components are flooring components in accordance with any one of Embodiments 1 to 5.

Embodiment 15

A method of installing flooring (1150), the method comprising:
arranging a first plurality of flooring components in accordance with any one of claims 6 to 8 on a floor (1060) such that one of said first major surface and said second major surface of each of said flooring components contacts said floor and such that, for each of a second plurality of said flooring components, a portion of the respective flooring component shaped by said first recessed portion of the respective flooring component engages a portion of a first adjacent one of said first plurality of flooring components shaped by said second recessed portion of said first adjacent flooring component in said counterpart engagement and a portion of the respective flooring component shaped by said second recessed portion of the respective flooring component matingly engages a portion of a second adjacent one of said first plurality of flooring components shaped by said first recessed portion of said second adjacent flooring component in said counterpart engagement.

Embodiment 16

A method of repairing flooring (1150), the method comprising:
pivoting a first flooring component (1000A) relative to a floor (1060), said pivoting effecting disengagement of a portion of said first flooring component shaped by said first recessed portion of said first flooring component and a portion of a third flooring component (1000C) shaped by said second recessed portion of said third flooring component from said counterpart engagement and disengagement of a portion of said first flooring component shaped by said second recessed portion of said first flooring component and a portion of a fourth flooring component (1000B) shaped by said first recessed portion of said fourth flooring component from said counterpart engagement; and
pivoting a second flooring component (1000A) relative to said floor, said pivoting engaging a portion of said second flooring component shaped by said first recessed portion of said second flooring component and a portion of said third flooring component shaped by said second recessed portion of said third flooring component in said counterpart engagement and engaging a portion of said second flooring component shaped by said second recessed portion of said second flooring component to a portion of said fourth flooring component shaped by said first recessed portion of said fourth flooring component in said counterpart engagement, wherein
each of said first, second, third and fourth flooring components are flooring components in accordance with any one of Embodiments 6 to 8.

Embodiment 17

The method of any one of Embodiments 13 to 16, wherein said floor is a floor of a cargo container.

The invention claimed is:
1. A flooring component comprising:
a flooring component body having a first major face and a second major face opposite said first major face, said first major face comprising a first major surface, said second major face comprising a second major surface;
a first recessed portion that defines a first recessed region in said first major face;
a second recessed portion that defines a second recessed region in said second major face; and
an inner-lying minor lateral surface interconnecting said first major surface and a minor surface of said first major face in said first recessed region, wherein
said first and second recessed portions are at diagonally opposite corners of said flooring component body,
said first recessed portion defines an engagement structure of a first snap lock engagement mechanism and said second recessed portion defines a counterpart engagement structure of a second snap lock engagement mechanism, said engagement structure having a shape that snappingly engages said counterpart engagement structure,
said flooring component is structured such that at least one of an engagement and a disengagement of said engagement structure from a counterpart structure of another identically-shaped flooring component, which counterpart structure has a shape of said counterpart engagement structure, is effectible only in a direction that differs from a direction perpendicular to said first major face of said flooring component body by an angle in the range of 0° to 45° when said flooring component is pivoted relative to a pivot axis proximate to said counterpart engagement structure, and
said engagement structure is distanced from said inner-lying minor lateral surface by at least 8 mm more than said counterpart engagement structure is distanced from an opposite, outer-lying minor lateral surface of said flooring component such that, when said engagement structure is engaged with said counterpart structure of said another flooring component, a gap of at least 8 mm is provided between a major surface of said flooring component and a substantially coplanar major surface of said another flooring component.

2. The flooring component of claim 1, wherein:
said first major surface is a contiguous surface that constitutes an entirety of said first major face of said flooring component body outside of said first recessed portion.

3. The flooring component of claim 2, wherein:
said second major surface is a contiguous surface that constitutes an entirety of said second major face of said flooring component body outside of said second recessed portion.

4. The flooring component of claim 1, wherein:
at least 60% of said flooring component is of a first material,
said flooring component comprises, in a region of at least one of said engagement structure and said counterpart engagement structure, a resilient portion of a second material more pliable than said first material, and
said engagement structure snappingly engages said counterpart engagement structure using a resilience of said resilient portion.

5. The flooring component of claim 1, comprising:
a bevel that interconnects said outer-lying minor lateral surface of said flooring component and a minor face of said flooring component comprising said counterpart engagement structure.

6. The flooring component of claim 1, wherein:
said first recessed portion has substantially a shape of a rectangular cuboid excepting structures that define said engagement structure; and
said second recessed portion has substantially a shape of a rectangular cuboid excepting structures that define said counterpart engagement structure.

7. The flooring component of claim 1, wherein:
one of said engagement structure and said counterpart engagement structure is a male structure that protrudes in a direction substantially perpendicular to said first major face; and
the other of said engagement structure and said counterpart engagement structure is a female structure that forms a recess in a direction substantially perpendicular to said first major face.

8. The flooring component of claim 1, wherein:
a width of said first recessed portion as measured in a first direction extending from said outer-lying minor lateral surface to said inner-lying minor lateral surface differs from a width, as measured in said first direction, of said second recessed portion by at least 8 mm.

9. The flooring component of claim 1, wherein:
one of said engagement structure and said counterpart engagement structure is a male structure distanced from an outermost edge of said flooring component by at least 10% and not more than 60% of a width, as measured in a first direction extending from said outer-lying minor lateral surface to said inner-lying minor lateral surface, of the first/second recessed region onto which said male structure is formed; and
the other of said engagement structure and said counterpart engagement structure is a female structure distanced from an outermost edge of said flooring component by at least 10% and not more than 60% of a width, as measured in said first direction, of the first/second recessed region into which said female structure is formed.

10. The flooring component of claim 1, wherein:
said flooring component has a width, $W_1$ $$W_1 = (W_2 - r)/n$$

where $W_2$ is a width of a floor of a standardized cargo container, r is a relaxation amount in the range of 1 to 10 cm, and n is a natural number in the range of 4 to 15.

11. The flooring component of claim 1, comprising:
at least one passage that extends in a lengthwise direction of said flooring component through an entirety of said flooring component.

12. The flooring component of claim 4, wherein:
at least 60% of said flooring component is of a first material,
one of said engagement structure and said counterpart engagement structure is a resilient male structure of a second material more pliable than said first material, and
said engagement structure snappingly engages said counterpart engagement structure using a resilience of said resilient male structure.

13. The flooring component of claim 4, wherein:
said resilient portion is integral with said flooring component body.

14. The flooring component of claim 12, wherein:
said resilient male structure is separable from said flooring component; and
said flooring component comprises a groove for receiving said resilient male structure, said flooring component and said resilient male structure comprising fastening structures for securing said resilient male structure in said groove.

15. The flooring component of claim 14, wherein:
another of said engagement structure and said counterpart engagement structure comprises a female structure, and
said resilient male structure is configured relative to a fastening structure of said groove and to a said female structure to attach more securely to said fastening structure than to a structure having the shape of said female structure.

16. The flooring component of claim 1, wherein said flooring component has a constant cross-section along an entire length of said flooring component.

17. A method of manufacturing a flooring component, comprising:
driving material through a die to produce an extruded product, and
sectioning off lengths of said extruded product, wherein said die has a cross-section that defines at least the following features of said extruded product:
a flooring component body having a first major face and a second major face opposite said first major face, first major face comprising a first major surface, said second major face comprising a second major surface;
a first recessed portion that defines a first recessed region in said first major face;
a second recessed portion that defines a second recessed region in said second major face;
an inner-lying minor lateral surface interconnecting said first major surface and a minor surface of said first major face in said first recessed region; and
an outer-lying minor lateral surface, opposite said inner-lying minor lateral surface, interconnecting said first major surface and a minor surface of said second major face in said second recessed region, wherein
said first and second recessed portions are at diagonally opposite corners of said flooring component body,
said first recessed portion and said second recessed portion define counterparts of a snap lock engagement mechanism, said first and second recessed portions being structured such that at least one of an engagement and a disengagement of said engagement mechanism counterparts is effectible only in a direction that differs from a direction perpendicular to said first major face of said flooring component body by an angle in the range of 0° to 45°, and
an engagement structure of said engagement mechanism is distanced from said inner-lying minor lateral surface by at least 8 mm more than a counterpart engagement structure of said engagement mechanism is distanced from said outer-lying minor lateral surface such that, when said engagement structure is engaged with a counterpart engagement structure of another identically-shaped flooring component, a gap of at least 8 mm is provided between a major surface of said flooring component and a substantially coplanar major surface of said another flooring component.

18. A method of manufacturing a flooring component, comprising:
producing an extruded product by extrusion; and
assembling a pliable element into said extruded product, wherein
at least 60% of said extruded product is of a first material,
said pliable element is of a second material more pliable than said first material,
said extruded product comprising:
a flooring component body having a first major face and a second major face opposite said first major face, first major face comprising a first major surface, said second major face comprising a second major surface;
a first recessed portion that defines a first recessed region in said first major face;
a second recessed portion that defines a second recessed region in said second major face, said first and second recessed portions being at diagonally opposite corners of said flooring component body;

an inner-lying minor lateral surface interconnecting said first major surface and a minor surface of said first major face in said first recessed region;

an outer-lying minor lateral surface, opposite said inner-lying minor lateral surface, interconnecting said first major surface and a minor surface of said second major face in said second recessed region; and a receiving structure in said one of said first recessed portion and said second recessed portion, said pliable element is assembled into said extruded product in one of said first recessed portion and said second recessed portion, said pliable element and another of said first recessed portion and said second recessed portion define counterparts of a snap lock engagement mechanism, said pliable element and said another of said first and second recessed portions being structured and arranged such that at least one of an engagement and a disengagement of said engagement mechanism counterparts is effectible only in a direction that differs from a direction perpendicular to said first major face of said flooring component body by an angle in the range of 0° to 45°, a portion of said pliable element is assembled into said receiving structure, and an engagement structure of said engagement mechanism is distanced from said inner-lying minor lateral surface by at least 8 mm more than a counterpart engagement structure of said engagement mechanism is distanced from said outer-lying minor lateral surface such that, when said engagement structure is engaged with a counterpart engagement structure of another identically-shaped flooring component, a gap of at least 8 mm is provided between a major surface of said flooring component and a substantially coplanar major surface of said another flooring component, a portion of said pliable element constituting one of said engagement structure and said counterpart engagement structure of said flooring component.

19. The method of claim 18, comprising:
producing said pliable element by extrusion.

20. A method of repairing flooring, the method comprising:

pivoting a first flooring component relative to a floor, said pivoting effecting disengagement of said first flooring component from a third flooring component; and pivoting a second flooring component relative to said floor, said pivoting effecting engagement of said second flooring component to said third flooring component, wherein each of said first, second and third flooring components comprises:

a flooring component body having a first major face and a second major face opposite said first major face, first major face comprising a first major surface, said second major face comprising a second major surface;

a first recessed portion that defines a first recessed region in said first major face;

a second recessed portion that defines a second recessed region in said second major face; and an inner-lying minor lateral surface interconnecting said first major surface and a minor surface of said first major face in said first recessed region, wherein said first and second recessed portions are at diagonally opposite corners of said flooring component body, said first recessed portion defines an engagement structure of a first snap lock engagement mechanism and said second recessed portion defines a counterpart engagement structure of a second snap lock engagement mechanism, said engagement structure having a shape that snappingly engages said counterpart engagement structure, said flooring component is structured such that at least one of an engagement and a disengagement of said engagement structure from a counterpart structure of another identically-shaped flooring component, which counterpart structure has a shape of said counterpart engagement structure, is effectible only in a direction that differs from a direction perpendicular to said first major face of said flooring component body by an angle in the range of 0° to 45° when said flooring component is pivoted relative to a pivot axis proximate to said counterpart engagement structure, and said engagement structure is distanced from said inner-lying minor lateral surface by at least 8 mm more than said counterpart engagement structure is distanced from an opposite, outer-lying minor lateral surface of the respective flooring component, said pivoting of said first flooring component relative to said floor effects disengagement of said engagement structure of said first flooring component from said counterpart engagement structure of said third flooring component; and said pivoting comprises a substantially rotational motion of said first flooring component relative to said pivot axis, said pivotal axis being proximate to a side of said first flooring component distal to said engagement structure.

21. The method of claim 20, wherein
said pivoting of said second flooring component relative to said floor effects engagement of said engagement structure of said second flooring component to said counterpart engagement structure of said third flooring component.

22. The method of claim 20, wherein
said pivoting of said first flooring component comprises deforming a resilient portion of at least one of said first flooring component and said third flooring component, and said pivoting of said second flooring component comprises deforming a resilient portion of at least one of said second flooring component and said third flooring component.

23. The method of claim 20, wherein said pivoting of said first flooring component comprises prying said first flooring component from said third flooring component by means of a tool inserted into a gap between a major surface of said first flooring component and a major surface of said third flooring component.

24. The method of claim 20, wherein said pivoting of said first flooring component is effected without laterally dislocating said third flooring component and said pivoting of said second flooring component is effected without laterally dislocating said third flooring component.

25. The method of claim 20, wherein said floor is a floor of a cargo container.

26. A flooring system comprising:
a first flooring component; and
a second flooring component, each of said first flooring component and said second flooring component comprising:

a flooring component body having a first major face and a second major face opposite said first major face, first major face comprising a first major surface, said second major face comprising a second major surface;

a first recessed portion that defines a first recessed region in said first major face; and a second recessed portion that defines a second recessed region in said second major face, wherein said first and second recessed portions are at diagonally opposite corners of said flooring component body, and said first recessed portion and said second recessed portion define counterparts of a snap lock engagement mechanism, said first and second recessed portions being structured such that at least one of an engagement and a disengagement of said engagement mechanism counterparts is effectible only in a direction that differs from a direction perpendicular to said first major face of said flooring component body by an angle in the range of 0° to 45°, wherein said first recessed portion of said first flooring component and said second recessed portion of said second flooring component are shaped such that said first flooring component is positionable relative to said second flooring component such that said first recessed portion of said first flooring component engages said second recessed portion of said second flooring component and said first major surface of said first flooring component is substantially coplanar to said first major surface of said second flooring component, a gap of at least 8 mm being formed between said first major surface of said first flooring component and said first major surface of said second flooring component.

27. A flooring system, comprising:

a first flooring component;

a second flooring component substantially identical to said first flooring component; and a third flooring component substantially identical to said first flooring component, said first flooring component comprising:
  a major surface;
  a first snap connector proximate to a first side of the flooring component; and
  a second snap connector proximate to a second side of the flooring component opposite said first side, said first flooring component being configured such that, when said first snap connector of said first flooring component is connected to said second snap connector of said second flooring component, said major surface of said first flooring component is substantially coplanar to said major surface of said second flooring component and a gap of at least 8 mm is present between said major surface of said first flooring component and said major surface of said second flooring component, said first flooring component being configured such that, when said second snap connector of said first flooring component is connected to said first snap connector of said third flooring component, said major surface of said first flooring component is substantially coplanar to said major surface of said third flooring component and a gap of at least 8 mm is present between said major surface of said first flooring component and said major surface of said third flooring component, said first flooring component being configured such that said first snap connector of said first flooring component is engageable and disengageable to said second snap connector of said second flooring component in a direction substantially perpendicular to said major surface of said first flooring component and said major surface of said second flooring component, and said first flooring component being configured such that said second snap connector of said first flooring component is engageable and disengageable to said first snap connector of said third flooring component in a direction substantially perpendicular to said major surface of said first flooring component and said major surface of said third flooring component.

28. The flooring system of claim 27, wherein said first flooring component has a constant cross-section.

29. The flooring system of claim 27, wherein at least 80% of a volume of said first flooring component is of a first material, and at least one of said first snap connector of said first flooring component and said second snap connector of said first flooring component comprises a second material more pliable than said first material, said second material providing snap engagement functionality.

30. The flooring system of claim 29, wherein said second material constitutes an integral portion of said first flooring component.

* * * * *